(12) United States Patent
Klemencic

(10) Patent No.: US 8,881,805 B2
(45) Date of Patent: Nov. 11, 2014

(54) SYSTEMS AND METHODS FOR AN ARTIFICIAL GEOTHERMAL ENERGY RESERVOIR CREATED USING HOT DRY ROCK GEOTHERMAL RESOURCES

(75) Inventor: Paul M. Klemencic, Hillsboro, OR (US)

(73) Assignee: Skibo Systems LLC, Hillsboro, OR (US)

( * ) Notice: Subject to any disclaimer, the term of this patent is extended or adjusted under 35 U.S.C. 154(b) by 0 days.

(21) Appl. No.: 13/636,331

(22) PCT Filed: Mar. 17, 2011

(86) PCT No.: PCT/US2011/028841
§ 371 (c)(1),
(2), (4) Date: Nov. 16, 2012

(87) PCT Pub. No.: WO2011/119409
PCT Pub. Date: Sep. 29, 2011

(65) Prior Publication Data
US 2013/0056171 A1    Mar. 7, 2013

Related U.S. Application Data

(60) Provisional application No. 61/316,234, filed on Mar. 22, 2010.

(51) Int. Cl.
| | | |
|---|---|---|
| *B65G 5/00* | (2006.01) | |
| *E21B 36/00* | (2006.01) | |
| *E21B 43/30* | (2006.01) | |
| *E21F 17/16* | (2006.01) | |
| *F03G 4/00* | (2006.01) | |
| *F24J 3/08* | (2006.01) | |
| *F03G 7/04* | (2006.01) | |

(52) U.S. Cl.
CPC . *F03G 7/04* (2013.01); *F24J 3/086* (2013.01); *Y02E 10/16* (2013.01)
USPC .......................................................... 166/245

(58) Field of Classification Search
None
See application file for complete search history.

(56) References Cited

U.S. PATENT DOCUMENTS

| | | | |
|---|---|---|---|
| 2,911,792 A | 11/1959 | Herre | |
| 3,817,038 A * | 6/1974 | Paull et al. | .................... 60/641.2 |

(Continued)

FOREIGN PATENT DOCUMENTS

| | | |
|---|---|---|
| GB | 1 524 236 | 9/1978 |
| JP | 2009-068459 | 4/2009 |
| WO | WO-2007/134466 | 11/2007 |

OTHER PUBLICATIONS

International Search Report (ISA/KR) for International Application No. PCT/US2011/028841, mailed Nov. 30, 2011, 4 pages.

(Continued)

*Primary Examiner* — George Suchfield
(74) *Attorney, Agent, or Firm* — Foley & Lardner LLP; John M. Lazarus; James M. Campbell

(57) ABSTRACT

Methods are described for using heated fluids from enhanced geothermal systems projects that recover geothermal heat from hot dry rock resources, and then injecting the heated pressurized fluids into a suitable rock formation to create an artificial geothermal energy reservoir. The artificial geothermal reservoir can then be used to store thermal energy by boosting the enthalpy of injected fluids by exchanging against heated fluids from other sources including a solar thermal power plant. Recovered heated fluids are utilized in a geothermal power plant and the spent geothermal fluids can be injected to recover additional thermal energy from hot dry rock resources. One embodiment is a geosolar electric power generation project to provide a steady and flexible source of renewable energy from a hot dry rock geothermal source integrated with a concentrating solar power project.

18 Claims, 8 Drawing Sheets

(56) References Cited

U.S. PATENT DOCUMENTS

| | | | |
|---|---|---|---|
| 3,886,749 A | 6/1975 | Pacault | |
| 3,891,496 A | 6/1975 | Erwin | |
| 3,998,695 A | 12/1976 | Cahn et al. | |
| 4,003,786 A | 1/1977 | Cahn | |
| 4,074,754 A | 2/1978 | Christian | |
| 4,089,744 A | 5/1978 | Cahn | |
| 4,137,719 A | 2/1979 | Rex | |
| 4,146,057 A | 3/1979 | Friedman et al. | |
| 4,164,848 A | 8/1979 | Gilli et al. | |
| 4,173,125 A | 11/1979 | Bradshaw | |
| 4,223,729 A | 9/1980 | Foster | |
| 4,357,802 A | 11/1982 | Wahl et al. | |
| 4,364,232 A | 12/1982 | Sheinbaum | |
| 4,428,190 A | 1/1984 | Bronicki | |
| 4,920,749 A | 5/1990 | Letarte | |
| 5,515,679 A * | 5/1996 | Shulman | 60/641.2 |
| 5,626,019 A | 5/1997 | Shimizu et al. | |
| 6,668,554 B1 * | 12/2003 | Brown | 60/641.2 |
| 7,096,665 B2 | 8/2006 | Stinger et al. | |
| 7,472,548 B2 | 1/2009 | Meksvanh | |
| 8,739,512 B2 | 6/2014 | Mills | |
| 2004/0107700 A1 | 6/2004 | McClanahan et al. | |
| 2005/0126170 A1 | 6/2005 | Litwin | |
| 2005/0150226 A1 | 7/2005 | Perkins et al. | |
| 2006/0026961 A1 | 2/2006 | Bronicki | |
| 2006/0048770 A1 * | 3/2006 | Meksvanh et al. | 126/620 |
| 2007/0223999 A1 | 9/2007 | Curlett | |
| 2007/0227146 A1 | 10/2007 | Seidel | |
| 2008/0134681 A1 | 6/2008 | Nayef et al. | |
| 2008/0276616 A1 | 11/2008 | Flynn et al. | |
| 2009/0121495 A1 | 5/2009 | Mills | |
| 2009/0179429 A1 | 7/2009 | Ellis et al. | |
| 2010/0199669 A1 | 8/2010 | Gathmann | |
| 2010/0258760 A1 | 10/2010 | Bauer et al. | |
| 2010/0295306 A1 | 11/2010 | Ridnik et al. | |
| 2011/0016864 A1 | 1/2011 | Wright et al. | |
| 2011/0100005 A1 | 5/2011 | Sampson et al. | |
| 2011/0100611 A1 | 5/2011 | Ohler et al. | |
| 2011/0137480 A1 | 6/2011 | Sampson et al. | |
| 2011/0308249 A1 * | 12/2011 | Mandelberg et al. | 60/641.15 |
| 2012/0124998 A1 | 5/2012 | Newman | |
| 2013/0147197 A1 | 6/2013 | Goebel et al. | |

OTHER PUBLICATIONS

Office Action on U.S. Appl. No. 12/562,080 dated Sep. 27, 2013.
Non-Final Office Action on U.S. Appl. No. 13/636,332 Dated Jun. 19, 2014, 22 pages.

* cited by examiner

SYSTEMS AND METHODS FOR AN ARTIFICIAL GEOTHERMAL ENERGY RESERVOIR CREATED USING HOT DRY ROCK GEOTHERMAL RESOURCES

CROSS-REFERENCE TO RELATED APPLICATIONS

The present application is a national stage application under 35 U.S.C. §371 of International Application No. PCT/US2011/028841, filed Mar. 17, 2011, which in turn claims priority under 35 U.S.C. §119(e) to U.S. Provisional Patent Application No. 61/316,234, filed Mar. 22, 2010, the entire contents of which are hereby incorporated by reference into the present disclosure.

FIELD

The field of the disclosure relates generally to geothermal energy resources. More specifically, the disclosure relates to systems and methods for development of an artificial geothermal energy reservoir using hot dry rock geothermal resources. More particularly, the disclosure relates to an artificial geothermal energy reservoir for use with a geothermal power plant. Yet more particularly, the disclosure relates to an artificial geothermal reservoir capable of receiving and storing heat during periods of excess capacity from other heat sources including concentrated solar power plants, thermal energy storage modules, and other hot dry rock geothermal formations.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Geothermal power plants usually have fairly low thermal efficiencies relative to solar thermal plants and most other power plants, because of the lower-temperature fluids produced from most geothermal reservoirs. Even a stream produced from a highly efficient geothermal resource will normally flash steam with a temperature less than 450° F. (232° C.). An optimized steam Rankine-cycle power plant utilizing steam flashed from produced geothermal brine will typically enjoy a thermal efficiency of 25% or less, and such efficiency only applies to heat available in the flashed steam, typically less than a quarter of the total mass of the produced geothermal fluids. For this reason, many geothermal resources that might otherwise be considered potential sites for geothermal electric power production do not have sufficiently high thermal efficiency to result in an economically attractive project. Thus, many geothermal and hydrothermal reservoirs are not developed for electric power generation. The thermal energy otherwise available in such resources remains inaccessible from an economic standpoint and thus remains untapped.

Typically, geothermal power plants are fairly small, with the majority less than about 100 MW in generating capacity, as a result of reservoir and other limitations. Despite current limitations in generating capacity, which result from a combination of the limitations of current methods, commercial considerations, and reservoir characteristics, many geothermal reservoirs contain a very large amount of thermal energy that could be extracted if the combination of technological and commercial considerations allowed, especially over a long period of time. The available geothermal heat per square mile of geothermal field associated with a 50° F. (28° C.) temperature change within the field (fluids and rock included) is believed to be over 190 trillion BTU per square mile. In an eight-square-mile geothermal structure, the available thermal energy could reach about 1500 trillion BTU, the heat-equivalent of approximately 1.5 TCF of natural gas. Thus, geothermal heat sources are potentially very large energy sources, if they can be tapped and utilized efficiently. Unfortunately, a substantial majority of these sources do not have the requisite temperatures and hydrothermal flows needed to economically sustain a geothermal power plant over a period of time sufficient to make such a project economically attractive. Thus, methods to efficiently access a greater portion of the immense thermal energy within a broad range of geothermal reservoirs would substantially increase society's ability to harness geothermal resources for electric power generation.

There have been attempts to recover heat energy from geothermal heated rock formations that do not contain significant quantities of water. Generally these formations are called hot dry rock (HDR) formations to distinguish these sources of geothermal heat from traditional geothermal heat sources such as hydrothermal fields or dry steam fields. The methods for recovery of geothermal heat from HDR formations typically involves drilling a well into the rock formation, fracturing the formation and mapping the fractured structure, then drilling and completing a second well into the fractured zone of the rock formation. A fluid, typically water or brine, is injected into the first well and migrates through the rock fractures to the second well. The fluid will absorb heat from the HDR and the heated fluid will be produced in the second well and typically used to provide heat to a geothermal power plant. The methods for drilling, fracturing, treating, and completing the set of wells for injecting and recovering heated fluid are diverse and extensive and significant current effort to develop these methods are underway. Collectively these methods are typically called 'engineered geothermal systems' (EGS).

The temperatures of HDR formations will generally increase with depth, and although geothermal heated rock formations could be reached by deep drilling, in certain geographical regions there are locations where higher temperature gradients exist. In these location and higher temperature geothermal rock formations are more accessible. The United States Department of Energy contributed funding for a number of initial EGS projects to test methods to recover geothermal energy from HDR formations in anomalous geological structures containing rock formations at a depth accessible with drilled wells without incurring extraordinary drilling costs. For the United States mainland for example, certain regions in the west have rock formation temperatures believed to be suitable for EGS projects to recover geothermal energy from HDR at depths that can be reached with wells drilled to a depth of approximately 20,000 feet. Some locations should encounter rock formations with suitable temperatures at less than approximately 15,000 feet.

Anderson (1978) attempted to increase the overall efficiency of a geothermal power plant by segregating higher-temperature wells that produce more steam into a high-temperature gathering system and collecting lower-temperature geothermal fluids in a separate gathering system. In the geothermal electric power plant, the higher-temperature thermal energy is transferred by heat exchange into a dual power-fluid cycle, which improves the capability of the plant to efficiently generate electric power. Unfortunately, sizable geothermal reservoirs that are suitable for the segregation process of Anderson are generally rare, resulting in limited opportunities for the application of this process.

There have been methods described that very high temperature aqueous solutions at supercritical conditions could be used to enhance oil recovery and to create synthetic geothermal reservoirs in oil fields. Specifically, Meksvanh et al. (2006) describes a method for injecting a supercritical brine into porous or permeable geologic structures (e.g., sedimentary rock formations) for the purpose of enhancing oil recovery from oil fields. The resulting synthetic reservoirs can subsequently be used for thermal storage and electricity production. The Meksvanh method is understood to use solar concentrators to heat reservoir brine directly to temperatures exceeding both the critical temperature and the critical pressure of the brine, which should exceed the supercritical temperature and pressure of water (374° C. and 22 MPa, or 705.4° F. and 3204 psia).

There have also been attempts to use solar energy to "augment" geothermal energy by heating geothermal fluids after they are produced from a reservoir. Rappoport (1978) used heat-transfer fluids to collect geothermal heat from remote wells, then uses solar collectors to replenish heat lost from these streams in transit and to add heat to the heat-transfer fluid before utilizing the heat in a centralized geothermal power plant. There have been attempts to evaluate and develop hybrid solar geothermal energy electric power generation systems. In these processes, the radiant energy from solar concentrators is absorbed directly into the fluids that contain the geothermal sourced heat and these fluids are used for power generation.

Various types of solar thermal electric power generation plants either already exist commercially or are in late developmental stages. These plants collect and concentrate solar energy (energy contained in sunlight) and convert the solar energy to thermal energy (heat). The thermal energy is then used to generate electric power.

Even in geographic locations that enjoy substantial, strong sunlight and relatively clear weather year-round, the available sunlight is often not sufficient to generate enough electricity to fully utilize, and maximize the economic investment in, a solar thermal plant. For example, solar thermal plants that lack thermal energy storage capabilities cannot generate electricity during nighttime or on overcast days. In addition, the number of hours of daylight are defined and constrained by season.

Some of these limitations can be overcome or lessened by storing thermal energy produced when sunlight is sufficient and recovering it to generate electricity when sunlight is unavailable or insufficient. The degree to which these limitations can be overcome or lessened, and the degree to which the overall utilization of the plant can be expanded, depend primarily on the amount of thermal storage available to the plant and the size of the solar energy collection field relative to the plant's electricity-generating capacity. Most of the thermal storage approaches that have been commercialized to date involve limited capacities that facilitate storage of thermal energy sufficient to operate the generators for about four to six hours. However, some studies suggest that it may be possible to store thermal energy for up to about 16 hours. This storage capacity allows a solar thermal plant to generate electricity into the late afternoon and evening hours or, at most, overnight, following a day of sufficient sunlight. However, it generally does not allow a plant to store thermal energy during a sunny season for electricity production during a less sunny season or during successive overcast days, or to continue operation during successive overcast days even in a season of normally strong sunlight.

Current methods of short-term thermal energy storage (TES) typically include steam accumulators, pressurized hot-water tanks, hot oil/rock storage vessels, solid media storage (usually concrete or ceramics), and molten salt. These methods become costly when used to store more than a few hours worth of the heat needed for medium-size or larger electric power plants. In addition, none of these methods adequately addresses long-term, seasonal storage needs.

Accordingly, it would be desirable to provide an improved system and method for geothermal production that overcomes the drawbacks and limitations of the known systems.

SUMMARY

Methods for injecting pressurized sub-critical fluids into a suitable rock formation to create an artificial geothermal energy reservoir are provided according to various exemplary embodiments. The artificial geothermal reservoir may contain heated fluids in the temperature range of approximately 100 to 200 deg C. Generally the suitable rock formation shall be either permeable or either have naturally occurring fractures or could be artificially fractured or otherwise altered to allow flow of the injected fluids through the formation resulting in an accumulation of heated injected fluids. The injected fluids could be sourced from supplies of water or brine, or could use formation water produced from the target artificial geothermal reservoir. In some embodiments the injected fluids could be supplied from a geothermal hydrothermal reservoir, or could consist of spent brine from a geothermal power plant. Any of these fluid sources could be further heated by a process for recovering thermal energy from hot dry rock formations, wherein the fluids circulate through a fractured section of the formation and heat by contact with the hot rock. Additional sources of heat for the artificial geothermal reservoir initial preheat stage could include thermal energy removed from a thermal power plant, thermal energy from concentrated solar thermal collections systems, thermal energy from waste heat including flue gases or exhaust gases, or thermal energy from a thermal energy storage system.

Methods are also provided that further heat injected fluids to higher temperatures in the range of 180 to 320 deg C. and store thermal energy in the artificial geothermal reservoir according to various exemplary embodiments. One embodiment would remove thermal energy from a concentrated solar thermal power plant and store the thermal energy in the artificial geothermal reservoir. Addition heat sources for thermal energy storage may include thermal energy recovered from hot dry rock formations, or the primary heat sources for the thermal power plant. In such an embodiment, thermal energy from the sources listed above could also be stored. The higher temperature heated fluids would displace preheated fluids from the artificial geothermal reservoir and would accumulate a significant store of thermal energy intended to be accessible on either a daily basis, or on a seasonal basis.

Thermal energy can be recovered in the current methods by producing the heated fluids from the artificial geothermal reservoir and further utilized in a geothermal power plant to generate electricity according to an exemplary embodiment. Various zones in the artificial geothermal reservoir would contain heated fluids at various enthalpies, and produced fluids segregated by zone could provide multiple feeds to the geothermal power plant. Once the artificial geothermal reservoir has been established and preheated, methods for storing, recovering, and utilizing thermal energy from the artificial geothermal reservoir include the Geosolar Injection Methods that are described in U.S. patent application Ser. No. 12/562,080 titled "Methods and Systems for Electric Power Generation Using Geothermal Field Enhancements" and filed on Sep. 17, 2009, the subject matter of which is incorporated by reference herein in its entirety. Additional methods for integrating thermal energy storage of solar thermal energy to provide continual higher temperature thermal energy for utilization in the geothermal power plant include Basic Geosolar Methods that are described in U.S. Provisional Patent Application No. 61/316,240 titled "Systems and Methods for Integrating Concentrated Solar Thermal and Geothermal Power Plants Using Multistage Thermal Energy Storage" and filed on Mar. 22, 2010, the subject matter of which is incorporated by reference herein in its entirety.

A method is also provided according to an exemplary embodiment for creating an extended fractured section in hot dry rock formations using a repetitive drilling and fracturing process that could add considerable recoverable thermal energy resource for use in the current methods. Thermal energy recovered from the extended fractured section can be used to heat the artificial geothermal reservoir, or can be utilized in the geothermal power plant. Methods are included that provide various injection and production well completion configurations to efficiently and effectively recover thermal energy by circulating injected fluid through the extended fractured section.

An engineered geothermal production system is also provided according to an exemplary embodiment, which includes an underground reservoir having a naturally-occurring formation fluid and an underground hot dry rock formation where a section has been artificially fractured. A source of an injection fluid and at least one injection well and one production well completed in the fractured section of the hot dry rock formation are also provided. A pump circulates the injection fluid through the hot dry rock formation to heat the injection fluid. A pump and at least one injection well direct the injection fluid heated by the hot dry rock formation into the underground reservoir to displace and preheat the formation fluid to a preheat temperature within a range of approximately 100-200° C. A heat exchanger receives the preheated formation fluid from at least one production well in the underground reservoir, and raises the enthalpy of the preheated formation fluid by transferring heat from an external heat source to the preheated formation fluid, and returns higher enthalpy formation fluid to the underground reservoir to create an artificial geothermal reservoir having a production fluid hot zone with a temperature within a range of approximately 180-320° C. The production fluid hot zone of the artificial geothermal reservoir is sufficient to provide a source of geothermal energy to a geothermal power plant for generating electricity. This system has wide applicability in developing concentrated solar thermal power projects and engineered geothermal systems projects to recover geothermal energy from hot dry rock resources.

DETAILED DESCRIPTION

Figure 1:
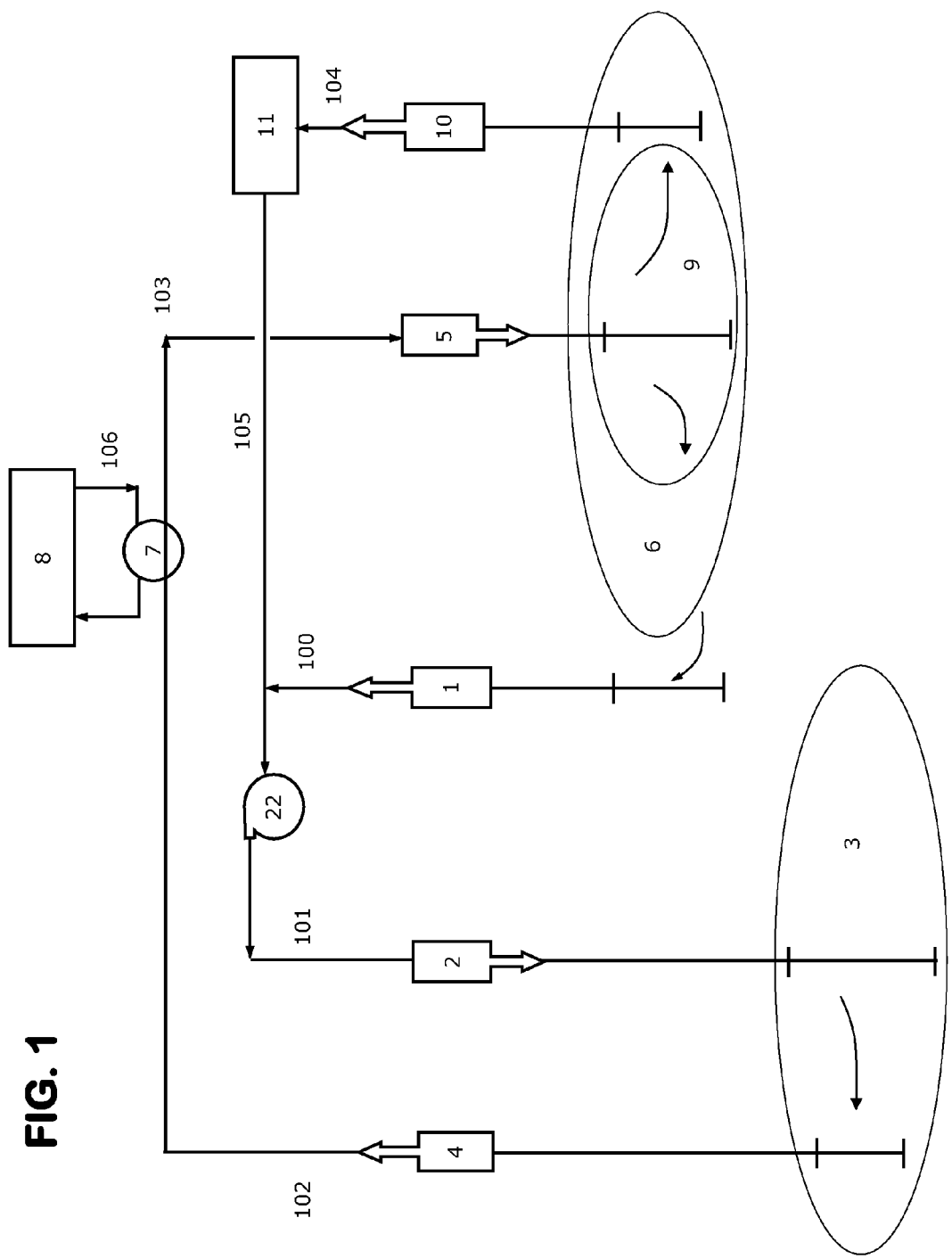
FIG. 1 is a block flow schematic diagram combined with a schematic drawing illustrating an exemplary embodiment of the invention showing the flow of fluids from a brine reservoir through a separate fractured hot dry rock formation, then through an external heater with the heated fluids injected into a hot zone in the brine reservoir, followed by eventual hot fluids recovery and utilization in a geothermal power plant.

One embodiment of the invention uses geothermal energy recovered from a HDR geological zone using EGS methods, with an additional boost from thermal energy removed from a solar thermal power plant, to heat fluid injected into a shallower brine reservoir to form an artificial geothermal reservoir. The heated fluids from the artificial geothermal reservoir, when utilized in a geothermal power plant, provides electrical generating capacity even during low solar insolation months. This set of methods described herein according to the various embodiments effectively create a large reserve of thermal energy originally associated with highly variable and intermittent solar radiant energy, accessible on demand over the course of the entire year. Seasonal storage of solar derived thermal energy by the geosolar process represents a breakthrough that no other existing storage system is believed to provide. The methods also facilitates the utilization of lower temperature HDR resources to provide a flow of fluids to flood and displace existing fluids in the reservoir chosen for the artificial geothermal reservoir and thus pre-heat the reservoir prior to storing higher temperature thermal energy. This "HDR geosolar" electric power generation process stands unique in recovering geothermal energy from HDR formations and combining this energy with thermal energy extracted from a power plant utilizing solar thermal energy, and HDR geosolar should be useful in developing these emerging renewable energy sources. HDR geosolar projects should be attractive in high solar insolation regions where HDR resources suitable for EGS projects exist, such as (among others) the southwestern United States.

Another embodiment includes the construction and use of a relatively shallow brine reservoir for solar derived thermal energy storage for a concentrated solar power project (CSP TES reservoir option). Again, the use of a naturally occurring brine reservoir to store heated fluids allows the storage of large quantities of thermal energy, thus facilitating seasonal storage of solar derived thermal energy. Storing heated fluids, particularly pressurized hot water, high pressure steam, or pressurized hot brine, at temperatures that are suitable to feed thermal power plants using Rankine or Kalina cycles generally requires pressures that exceed 20 bara (approximately 290 psia), and preferentially higher temperatures with corresponding pressures exceeding 50 bara (approximately 725 psia). It is estimated that seasonal storage of solar heat from the spring and peak summer for a moderately sized CSP project, would generally need at least 80 to 100 million barrels of heated aqueous liquids, and preferable larger volumes. Seasonal storage of steam would need at least four million barrels of water vaporized into high-pressure steam. Surface storage of these heated fluids requires pressurized vessel storage and is impractical for these large volumes required for seasonal storage. Brine reservoirs can typically hold over a billion barrels of brine in the permeable formation. Storing 80-100 million barrels of heated fluids, or even more, is possible in a properly selected brine reservoir. The hot zone volume of the stored heated fluids would utilize only a portion of the brine reservoir volume.

Other embodiments could use surface supplies of water or brine, or other brine reservoirs, to provide makeup water that could be added to the artificial geothermal reservoir to supplement the naturally occurring supply of brine. If a naturally occurring hydrothermal reservoir doesn't contain sufficient reserves of brine, then heated fluids can be added to the reservoir. Alternatively, if the temperature of the brine is insufficient for a standalone geothermal field development, then the connate fluids can be produced, heated using thermal energy either from HDR sources or thermal energy removed from a solar thermal power plant, and reinjected to increase the enthalpy of the fluids in the reservoir. According to further embodiments, all of the applications mentioned so far could be utilized in a single project. All of these applications would benefit from the availability of relatively low cost, relatively lower temperature thermal energy; particularly thermal energy provided by EGS projects tapping a large reserve of HDR thermal reserves, especially where a portion of the thermal reserves have temperatures lower than currently considered necessary for efficient utilization in a geothermal power plant. All such embodiments are intended to be within the scope of this disclosure.

In the exemplary methods of the present embodiments, a relatively shallow permeable rock formation is selected to create an artificial geothermal reservoir. Three stages are described herein for developing an artificial geothermal reservoir using geothermal heat recovered from HDR zones augmented by an external heat source. The first stage uses the HDR geothermal heat to preheat the selected hot zone by circulating the HDR heated fluids through the artificial geothermal reservoir. This process includes injecting the preheated fluids into the hot zone. After some time the preheated fluids will have moved through the permeable rock formation or associated fractures in the reservoir and the convective heat front associated with the preheated fluids will reach the production wells on the periphery of the hot zone. Preheated fluids will displace fluids in the reservoir permeable formations and break through into these production wells. The second stage will involve using another heat source to begin heating the injected fluids thus increasing the enthalpy of the fluids injected into the hot zone. Eventually the hot zone accumulates significant volumes of the higher enthalpy fluids as externally heated fluids displace preheated fluids. The enthalpy of the fluids contained in the hot zone would be sufficient for utilization in a geothermal power plant. The third stage involves using hot production wells in the hot zone to produce the higher enthalpy fluids for utilization in a geothermal power plant, with the spent fluids from the plant recycled to the EGS injection wells.

The first stage of forming the artificial geothermal reservoir, the preheat stage, involves using thermal energy recovered from an EGS process to preheat a zone in the targeted permeable rock formation. In the EGS process, a fluid, typically pressurized water or brine is injected into a fractured hot dry rock formation that in this discussion will be refereed to as an HDR zone. The injected fluids circulate through the fractures in the HDR zone, absorbing thermal energy from the rock formation. HDR zone production wells produce the heated fluids, completing the circulation. As appreciated by those skilled in the art, there are many variations and configurations for EGS methods designed to recover thermal energy from HDR formations. Many of these methods would be applicable for recovering HDR thermal energy for utilization as described in the methods of the present embodiments.

In the methods of the present embodiments, the heated fluids produced from at least one HDR zone using EGS processes are injected into the target rock formation for the artificial geothermal reservoir. The current methods produce and transfer thermal energy from the HDR zone and store the recovered thermal energy in the artificial geothermal reservoir. Recovering thermal energy from HDR zones for use to preheat an artificial geothermal reservoir requires temperatures somewhat lower than needed for efficient and cost-effective direct utilization in a geothermal power plant. This enables the use of alternative methods to recover lower temperature thermal energy from a larger and more extensive HDR zone. Additional methods for extending and expanding the HDR heat recovery zones in an EGS project are discussed in more detail later for the methods of other exemplary embodiments.

Most EGS processes use aqueous fluids for injection into the HDR zone and thus require a source of injection water. If the targeted shallow permeable rock formation for the artificial geothermal reservoir contains formation water, typically brine, then this brine can be used for injection into the HDR zone. Otherwise a surface source of water or brine, or formation water or brine from a separate geologic reservoir is used as a source of fluid for HDR injection. In the later heat recovery third stage of the current methods, spent brine or condensate water from the geothermal power plant can be circulated and injected, thus recycling the fluid. But initially, and to some degree over time, a source of fluids should be available to inject into the HDR reservoir and to make up for any lost circulation in the EGS process.

FIG. 1 shows an embodiment that illustrates the basic process used during the preheat stage. The source of injection fluid 100 are formation water production wells 1 on the periphery of the targeted artificial geothermal reservoir zone 6. If the brine reservoir is part of an oil and gas field or is a geothermal field, associated gas or steam may flash from the produced fluid lowering the hydrostatic heads in the production wells, causing the wells to flow to the surface driven by the bottom hole pressure of the reservoir. If the production wells will not flow on their own, artificial lift methods or submersible pumps (not shown) may be used on the production wells 1 and 10. The produced fluids are pumped by an injection pump 22 and used to supply the EGS injection wells 2. If non-condensable gases or steam flows are produced, then the produced fluids will be processed using flash separators (not shown) prior to the injection pump 22.

After injection, the injected fluids 101 flow through fractures opened in the HDR zone 3 and are heated from contact with the hot rock. The EGS production wells 4 produce the heated fluids 102 which are pipelined to the artificial geothermal field injection wells 5. In the preheat stage, the brine heater 7 is bypassed and the preheated fluid 103 is sent directly to the injection wells 5 which inject the EGS heated fluids into the preheat zone 6 of what eventually will become the artificial geothermal reservoir. The preheated fluids displace formation fluids, which migrate toward the production wells 10 completed in the reservoir within zone 6 and toward the fresh brine production wells 1. Although FIG. 1 shows one injection well 5, one production well 10 completed in zone 6, and one brine production well 1, most intended applications would use numerous injection wells and production wells, with the injection wells typically in the central area of the artificial geothermal reservoir, and the production wells typically completed in the reservoir peripheral area surrounding the injection wells. Eventually the preheated fluids will have displaced natural occurring formation water and migrated to the edges of the hot zone 6.

The injected EGS heated brine will displace cooler brine in the brine reservoir similar to water floods in oil fields. Experience with water floods and steam floods tend to show that the injected fluids will travel through fractures and higher permeability rock formations in the reservoir, bypassing portions of the reservoir rock matrix and the fluids contained therein. Although FIG. 1 shows a schematic representation of a smooth preheat zone boundary in an oval shape for convenience, an actual preheat fluid flooded zone may have an irregular cross-section boundary zone, and an irregular area extent (e.g. resembling an amoeba shape or other irregular shape, rather than the symmetrical smooth and even boundary flooded zone shown in the Figures accompanying this Description). The actual shape of the flood front depends upon the reservoir rock formations and properties thereof.

Although a non-uniform flood tends to cause problems in water floods and steam floods, this shouldn't be a significant problem with the current methods. The intention of injecting the EGS heated brine is to accumulate a reserve store of heated brine that will be recovered later. A uniform flood would tend to lose more heat to the formation rock, and take longer to breakthrough to the nearest production wells, both undesirable results. Conductive heat flows into and from the saturated rock matrix tend to be slow, whereas convective heat flows due to brine moving through the reservoir are believed to be significantly higher. The temperature of the EGS heated brine after it breaks through to the nearest production wells in a non-uniform flood and has been circulated through the hot zone over a period of several years, will be higher than the brine temperature at the same point in time in a more uniform flood. After breakthrough, the temperature of the brine from the production well should increase faster as the portion of preheated fluid in the produced fluid increases. Faster ramp in temperature at some of the production wells also occurs because rock nearest the fractures and permeable streaks in the formation heats up to injected preheated fluid temperature, thus providing a hot conduit of fluid from the injectors to the hot producers. Eventually the injected EGS heated fluids will migrate from the injection wells to the production wells with only a minor drop in temperature. This result is consistent with water flood and steam flood experience. In these cases, floods that could take a long time (e.g. about 30 years) to break through in a uniform flood actually break through in only several years. This effect is a key enabler of the current methods, since the current methods work better if the heated fluids migrate more quickly from the injection wells to the production wells. According to a preferred embodiment, the preheat thermal front breakthrough would be sometime between six months and 24 months, and this can be controlled to some extent by the injection rate and injection pressure, injection and production well completion intervals, hydro-fracturing and other well treatments, and well spacing.

When the preheat temperature front reaches the first production wells, from water flood experience it is likely that less than a quarter of the original formation fluids in the hot zone have been displaced by the preheat fluids. To some extent, the displacement of the original water in place can be controlled by placement, fracturing and other formation treatments, and completion techniques. As the temperature of the produced fluids from one of the production wells increases, the well can be shut-in or converted and used as a preheat fluid injection well. In most anticipated cases where the preheated hot zone fluids are displaced, the injection of the preheat fluids would continue until more than half of the original fluids in place have been displaced by the preheat fluids. A significant fraction of the injected preheat fluids will also have been cooled by the rock formation and will have been produced in the production well, therefore the volume of the injected preheat fluids likely will approach or exceed the volume of the original fluids in place, in the hot zone, before the preheat stage is complete.

At the conclusion of the preheat stage, the temperature of most of the fluids in the hot zone 6 will be higher than the original formation water and the preheat fluid temperature front will have broken through to some production wells. But the produced fluids from these wells will still be at temperatures considered too low for effective utilization in a geothermal power plant.

When an artificial geothermal brine reservoir is established in a brine reservoir, the reservoir brine temperature should be in excess of about 150 deg C. (302 deg F.), and preferably higher than about 180 deg C. (356 deg F.), to be most effectively utilized in a geothermal power plant. If the brine temperature is less, the power plant tends to be rather inefficient, with a thermal efficiency typically less than about 10%. The preheat stage is used to raise the hot zone brine temperature to a floor level of utility, but the temperature and enthalpy of the fluids in the hot zone are increased further to provide a significant source of stored thermal energy useful for feed to geothermal power plants. Moving thermal energy from the HDR thermal resource to the artificial geothermal reservoir has some advantages, such as accumulating EGS heated brine that can be tapped at higher peak power generation levels. However, this is not as useful as accumulating and storing large quantities of thermal energy, particularly from variable and intermittent sources such as solar thermal energy. Preheating the artificial geothermal reservoir uses the cost effective lower temperature EGS heated fluids to establish a reserve of fluids with a floor level enthalpy, thus creating the opportunity to add higher enthalpy fluids to the hot zone thus storing large volumes of higher enthalpy aqueous fluids.

One embodiment of the current methods stores solar derived thermal energy from a standalone CSP project in a brine reservoir, forming an artificial geothermal reservoir. In this embodiment, the preheat source of thermal energy will likely be low pressure steam extracted from the low pressure steam turbine in the CSP plant and used to heat the injected fluids. In order to provide continuous preheat fluid injection, the thermal energy used for preheat can be stored in TES modules installed as part of the CSP project.

The second stage is the hot zone formation stage, where injecting higher enthalpy heated fluids forms a central hot zone 9. After the injected preheat fluids in the hot zone break through to some production wells 1 on the periphery of the zone in the preheat stage, the temperature of the hot zone can be further increased using an external heat source. FIG. 1 illustrates the method where EGS produced heated fluids are further heated by heat exchange 7 with hot fluids 106 from an external heat source 8.

If the artificial geothermal reservoir is established in a brine reservoir, the reservoir brine temperature should be raised to over about 205 deg C. (402 deg F.) to store a significant amount of thermal energy such that significant amounts of electricity can be generated when the brine is recovered. In most intended applications, the heated brine injected will be over about 205 deg C., but less than about 280 deg C., but in some zones the temperatures of the stored fluids could range from approximately 180 to 320 deg C. depending on overall project design and optimization. When the recovered fluids are utilized in a geothermal power plant, the thermal efficiency could reasonably range from about 12% up to about 25%, depending on the recovered fluid enthalpy and the power plant design. To get higher efficiencies would likely require that most of the injected fluids have temperatures over 280 deg C., which is unlikely to be the optimal economically.

The power generating capability from thermal energy recovered from these brines, is expected to be in the same range as the power generating capability of the thermal energy that was used to heat the injected brines, especially if a binary fluid Rankine cycle or Kalina cycle geothermal power plant is used. If the thermal energy was removed from a thermal power plant, and used to heat the injected brine, the loss in power generated due to removal of the thermal energy will be approximately similar to power generated using the recovered heated brine in a highly efficient geothermal plant provided the fluids recovered have a composite enthalpy relatively close to the injected fluids composite enthalpy. Generally, it is believe that the loss in power generating capability should be less than about 15%.

Although not shown in FIG. 1, in many cases the EGS produced fluids will be pumped to raise the pressure before the heat exchange 7 in order to prevent flashing in the exchanger. There are a variety of pump, separator, and heat exchange configurations that can be used with the current methods to increase the pressure and heat the fluids for injection into the artificial geothermal reservoir hot zone. In one embodiment, EGS produced brine is flash separated to remove non-condensable gases, pumped to 40 bars (approximately 600 psia) and heated in a series of heat exchangers using condensing steam with increasing pressures and temperatures to heat the brine to over 230 deg C., then injected into the hot zone. The wellhead pressure of 40 bars, plus the hydrostatic head in the injection well, should be sufficient for injection into a brine reservoir with much higher bottom hole pressures. Most brine containing rock formations have pressures less than the equivalent water hydrostatic head at the depth of the formation. Therefore a wellhead pressure of 40 bars should be more than sufficient to achieve a significant injection rate, because as the fluid descends to the bottom hole injection interval, the hydrostatic head of the column of the fluid above the injection interval increases the pressure and helps push the injected fluids into the permeable rock formation and associated fractures. Reducing the injection pump pressure is desirable, and methods to accomplish this are discussed in the Geosolar Injection Methods that are described in U.S. patent application Ser. No. 12/562,080 titled "Methods and Systems for Electric Power Generation Using Geothermal Field Enhancements" and filed on Sep. 17, 2009, the subject matter of which is incorporated by reference herein in its entirety.

The heat source used to heat the injected brine and store thermal energy, could be any heat source with a temperature higher than the recovered EGS heated fluids. Some likely heat sources according to exemplary embodiments include thermal energy collected in a solar field, hot working fluids extracted from a thermal power plant, thermal energy from a variety of TES systems, and thermal energy from heat recovery units on fuel fired heaters or gas turbines. In one possible embodiment, hot gases from the exhaust of an Ericsson cycle heat engine utilizing concentrated solar energy converted to thermal energy, could be used directly or captured using a HTF to heat the injected fluids. Even more likely, thermal energy contained in the hot exhaust gases from an Ericsson cycle could be recovered in a heat recovery steam generator (HRSG) similar to industry practice with Brayton cycle exhaust gases. The superheated high-pressure steam would feed a high-pressure steam turbine, and then steam can be extracted from this turbine in the temperature range where it is useful to heat injected fluids in the current methods (typically about 230 deg C. down to 180 deg C.).

The use of external heat sources, particularly thermal energy removed from thermal power plants (such as a CSP plant) to heat injected fluids to form a hot zone in a geothermal reservoir, is described further in U.S. patent application Ser. No. 12/562,080 titled "Methods and Systems for Electric Power Generation Using Geothermal Field Enhancements" and filed on Sep. 17, 2009, the subject matter of which is incorporated by reference herein in its entirety. In the current methods, at the conclusion of the preheat stage, an artificial geothermal reservoir has been created, and similar or identical methods as those contained in U.S. patent application Ser. No. 12/562,080 can be used to form a hot zone, and further, recover and utilize heated fluids from the hot zone in a geothermal power plant. U.S. patent application Ser. No. 12/562, 080 also included methods discussing the reservoir development plan, injection and production well operations including reversing well flows and managing heated fluids breakthrough and reservoir phased development, which are incorporated by reference herein in their entirety. As used herein, the methods described in U.S. patent application Ser. No. 12/562,080 (and incorporated by reference herein in their entirety) will be referred to as "Geosolar Injection Methods". Many of the methods included in Geosolar Injection Methods can also be applied to the preheat stage in the current methods.

As shown in FIG. 1, the heated fluids are injected into the artificial geothermal reservoir 6 to form a hot zone 9. The temperature in the hot zone will typically be higher by about 30 to 80 deg C. (58-144 deg F.) than the EGS recovered fluids. For example, the heated fluids recovered from the EGS could have a temperature of about 150 deg C. (302 deg F.), and this recovered fluid is further heated to about 232 deg C. (450 deg F.) before injection into the hot zone. Over time the injected hot fluids will displace the preheated fluids in the artificial geothermal reservoir and break through to the nearest production wells 10. The fluids that break through to the artificial geothermal reservoir production wells, could be recycled back through heater 7 to pick up additional heat from the external heat source, and then are re-injected. After a period of time, a sizable hot zone is created. In this case, the hot zone temperature would eventually exceed about 205 deg C. (402 deg F.). In some anticipated cases, the hot zone 9 should be established within two years. The breakthrough time can be controlled by injection and production well spacing and relative well positioning, fracturing and well completion techniques, and injection and production flow rates. This gives the artificial geothermal field operator the capability to control the injection and production rates, and consequently the ability to establish the hot zone within a reasonable timeframe. Controlling the hot zone development is further described in U.S. patent application Ser. No. 12/562,080 titled "Methods and Systems for Electric Power Generation Using Geothermal Field Enhancements" and filed on Sep. 17, 2009, the subject matter of which is incorporated by reference herein in its entirety.

Figure 2:
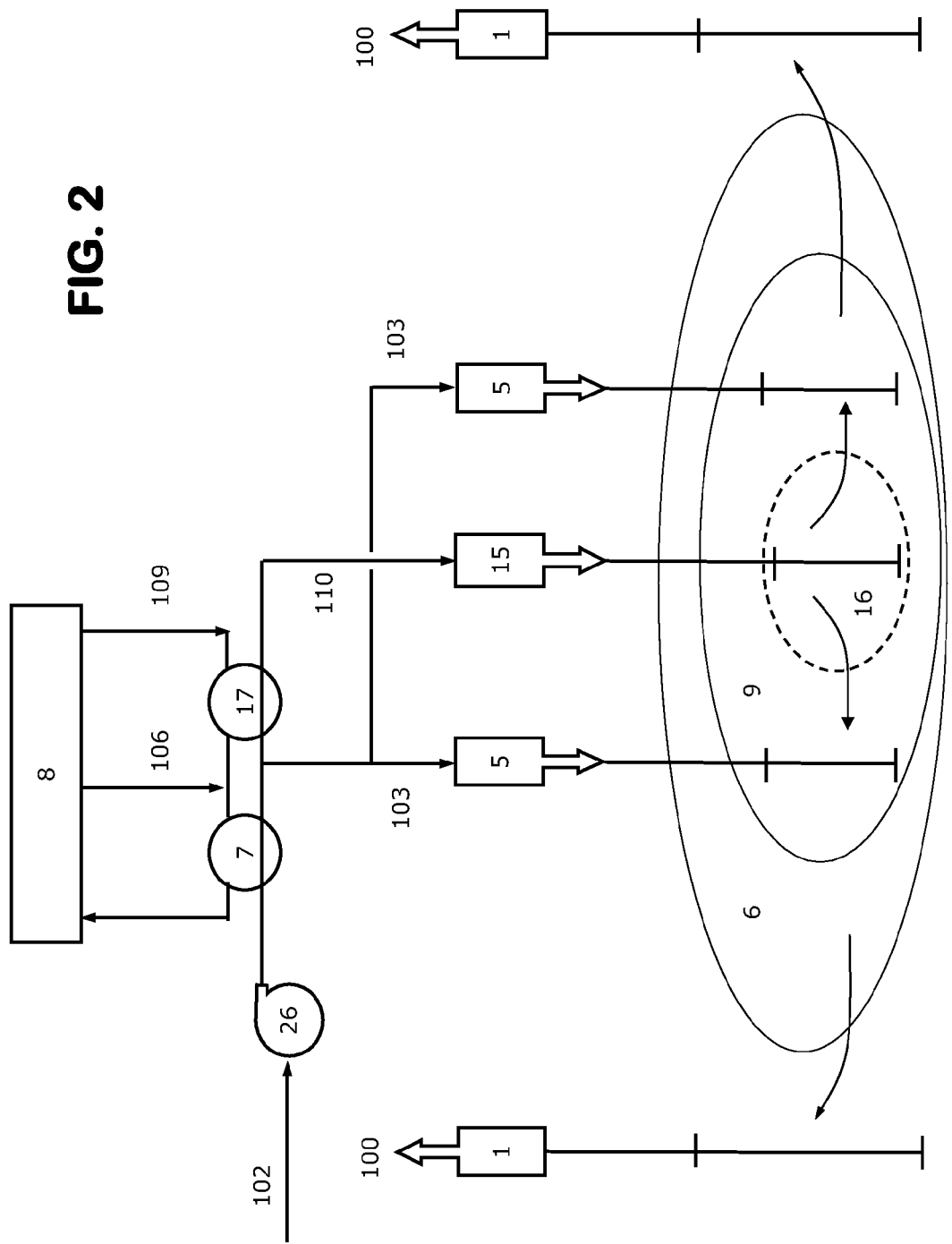
FIG. 2 is a block flow schematic diagram combined with a schematic drawing illustrating an exemplary embodiment wherein an artificial geothermal reservoir is created in a brine reservoir by circulating fluids to pre-heat the reservoir, then circulating heated fluids to form a hot zone, and then injecting higher temperature heated fluids to form a central hot zone.
Figure 3:
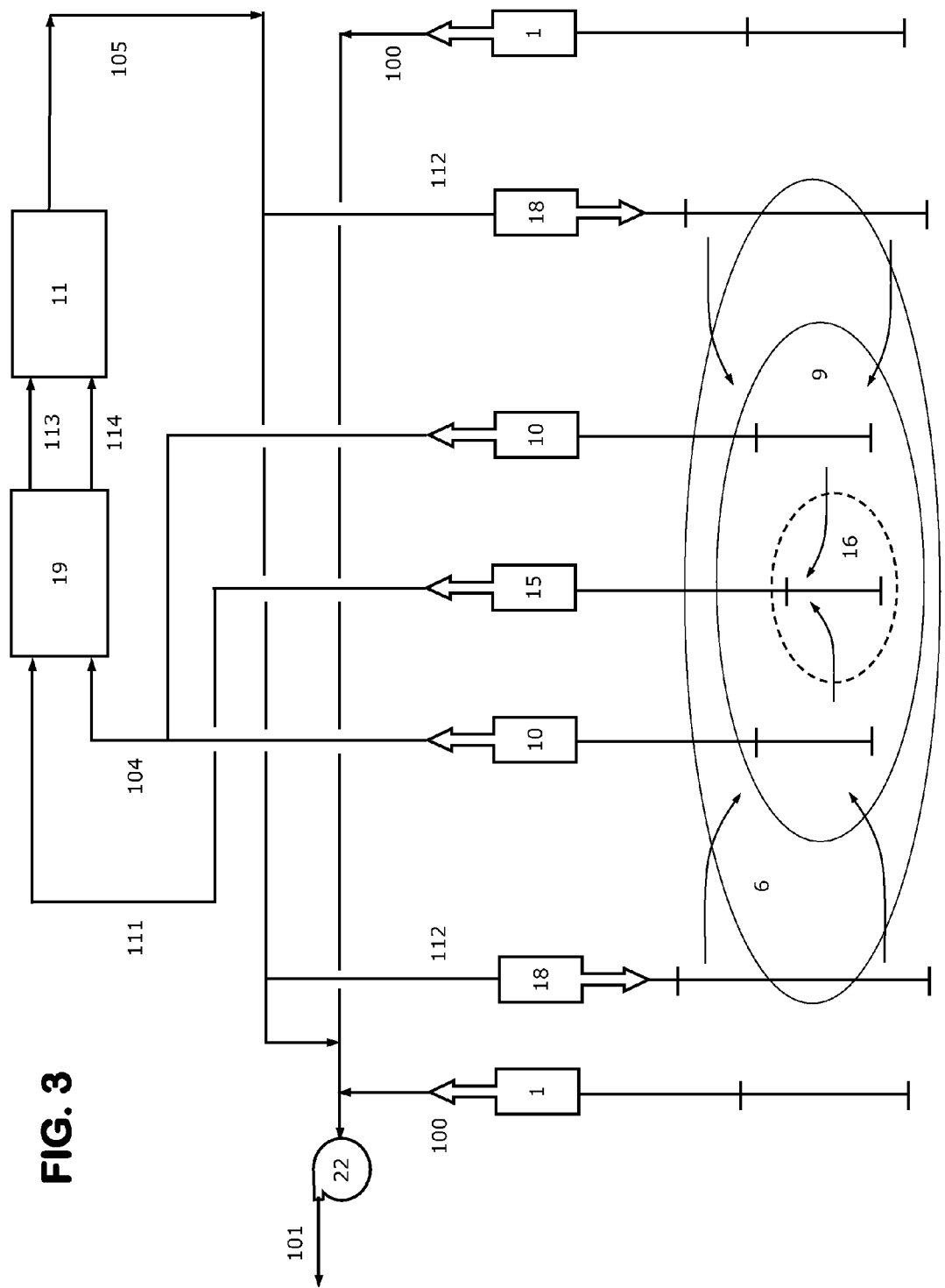
FIG. 3 is a block flow schematic diagram combined with a schematic drawing illustrating an exemplary embodiment wherein heated fluids are recovered from an artificial geothermal reservoir hot zone and central hot zone, and utilized in a geothermal power plant.

After the hot zone is well established, which could take several years, the enthalpy of the injected fluids can be increased further to begin forming a central hot zone. FIG. 2 shows a central hot zone injection well 15 injecting higher enthalpy fluid into the central hot zone 16. The enthalpy of the central hot zone fluids could be considerably higher than fluids elsewhere in the hot zone, and there is an advantage to keep these fluids separate from the other hot zone fluids. FIG. 3 shows how this can be accomplished by reversing the central hot zone injection wells 15. If the higher enthalpy fluids injected into the central hot zone have migrated far enough into the hot zone to reach the other hot zone injection wells 5 (FIG. 2), these wells could also be reversed. But in most cases, a continual injection capability provided by the hot injection wells 5 is desirable during certain seasons, and the central hot zone may only expand to reach these wells during the peak of seasonal storage. Therefore the reversal of injection wells 5 is likely to be a seasonal event. Likewise, the higher enthalpy central hot zone fluids could reach the production wells 10 (FIG. 3) that are in close fluid communication with the central hot zone injection wells 15, and these wells could produce fluids primarily from the central hot zone. Injecting the higher enthalpy fluids will cost more due to higher pressures required to avoid flashing in the fluid heaters as well as the added cost of higher temperature thermal energy used to heat the injection fluids. The decision to form a central hot zone, and store higher enthalpy fluids will likely be governed by economic considerations.

The third stage is heat recovery stage, where the artificial geothermal reservoir hot zone fluids are produced and utilized in a geothermal power plant. FIG. 3 shows hot zone fluids produced from the central hot zone production wells 10, with spent fluid circulated to flank injection wells 18 to provide the necessary circulation to achieve high production rates. The enthalpy of the produced fluids will depend on the bottom hole temperature of the fluids in the production wells. The production rate also depends to some degree on higher bottom hole temperatures leading to increased flash steam and lower hydrostatic heads in the production well bores.

The bottom hole temperature at the production wells can be controlled to some extent by encouraging fluid communication between the injection and production wells. In a permeable brine reservoir, most of the injected fluids should move along fractures and through the higher permeability rock formations, although higher temperature higher enthalpy injected fluids will mix to some degree with the preheated fluid in the hot zone as the preheated fluids are displaced. If the production wells are drilled and completed to intercept fractured zones and produce from the high permeability formations, the higher enthalpy injected fluids will be a higher fraction of the mixed enthalpy fluid produced and utilized in the geothermal power plant. The production wells 10 need to be drilled and completed to be in close communication with the hot zone injection wells 5 (see FIG. 2). One method to ensure this, involves reversing some of the hot injection wells 5, and use these wells as hot production wells 10, consistent with seasonal storage and recovery needs as previously discussed. Fluid communication between the injection and production wells can also be controlled by injection and production well spacing and relative well positioning, fracturing and well completion techniques, and injection and production well flow rates.

When the current methods are used to form an artificial geothermal reservoir in a brine reservoir, after a number of injection/recovery cycles, the temperature drop from the injection well to the closest production wells should be less than about 25 deg F. For example, if hot brine is injected at about 232 deg C. (450 deg F.), the brine could be recovered from the closest production wells at bottom hole temperatures over about 205 deg C. (402 deg F.) due to good fluid communication from the injection wells to the production wells, and with only minor mixing with remaining preheat fluids in the hot zone. A moderate temperature drop of about 25 deg C. should result in less than about 15% loss in power generating capability compared to the power generating capability of the thermal energy used to heat the injected fluids. If the produced fluids from the hot zone are utilized in a highly efficient binary fluid organic Rankine cycle geothermal power plant, the loss in power generating capability will be minimal, and an additional portion of the preheat thermal energy already present in the fluids can be converted to electricity. The resulting 'geosolar multiplier' will be greater than unity, indicating that more gross electricity is generated from the recovered fluids than was foregone when the thermal energy was removed from a thermal power plant to heat the injected fluids during the storage phase. The geosolar multiplier higher than unity, indicates that the thermal energy added during the preheat stage, typically geothermal energy expected to come from EGS projects, is partially converted to electricity in a sufficient quantity to offset loss in power generating capability from the injection/recovery process. The geosolar multiplier is further defined and discussed U.S. patent application Ser. No. 12/562,080 titled "Methods and Systems for Electric Power Generation Using Geothermal Field Enhancements" and filed on Sep. 17, 2009, the subject matter of which is incorporated by reference herein in its entirety.

Methods for recovering and utilizing fluids from a geothermal reservoir, integrated with thermal energy removed from CSP plants utilizing higher temperature thermal energy from concentrating solar thermal collection systems and additionally integrating thermal energy supplied by cascade multistage TES are described in U.S. Provisional Patent Application No. 61/316,240 titled "Systems and Methods for Integrating Concentrated Solar Thermal and Geothermal Power Plants Using Multistage Thermal Energy Storage" and filed on Mar. 22, 2010, the subject matter of which is incorporated by reference herein in its entirety. In the current methods, once the hot zone has been established, and an artificial geothermal reservoir has been created, then identical methods as those contained in that patent application can be used to recover and utilize heated fluids from the hot zone in a geothermal power plant integrated with a CSP plant and TES. As used herein, these methods will be referred to as "Basic Geosolar Methods".

Figure 4:
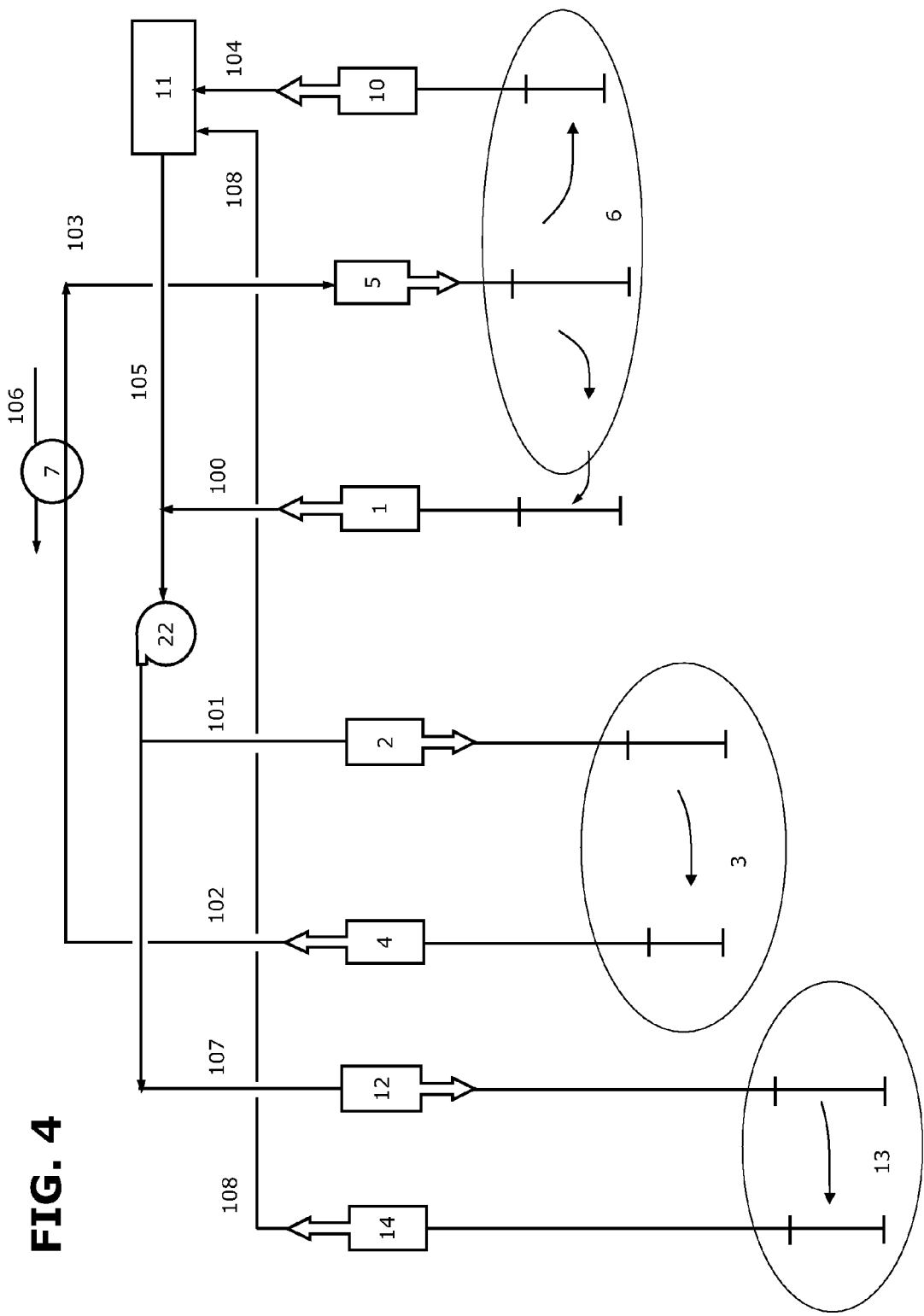
FIG. 4 is a block flow schematic diagram combined with a schematic drawing illustrating an exemplary embodiment wherein fluids are circulated through two fractured hot dry rock zones, with one zone providing fluids to pre-heat the artificial geothermal reservoir, and the other zone providing hot fluids for utilization in a geothermal power plant.
Figure 5:
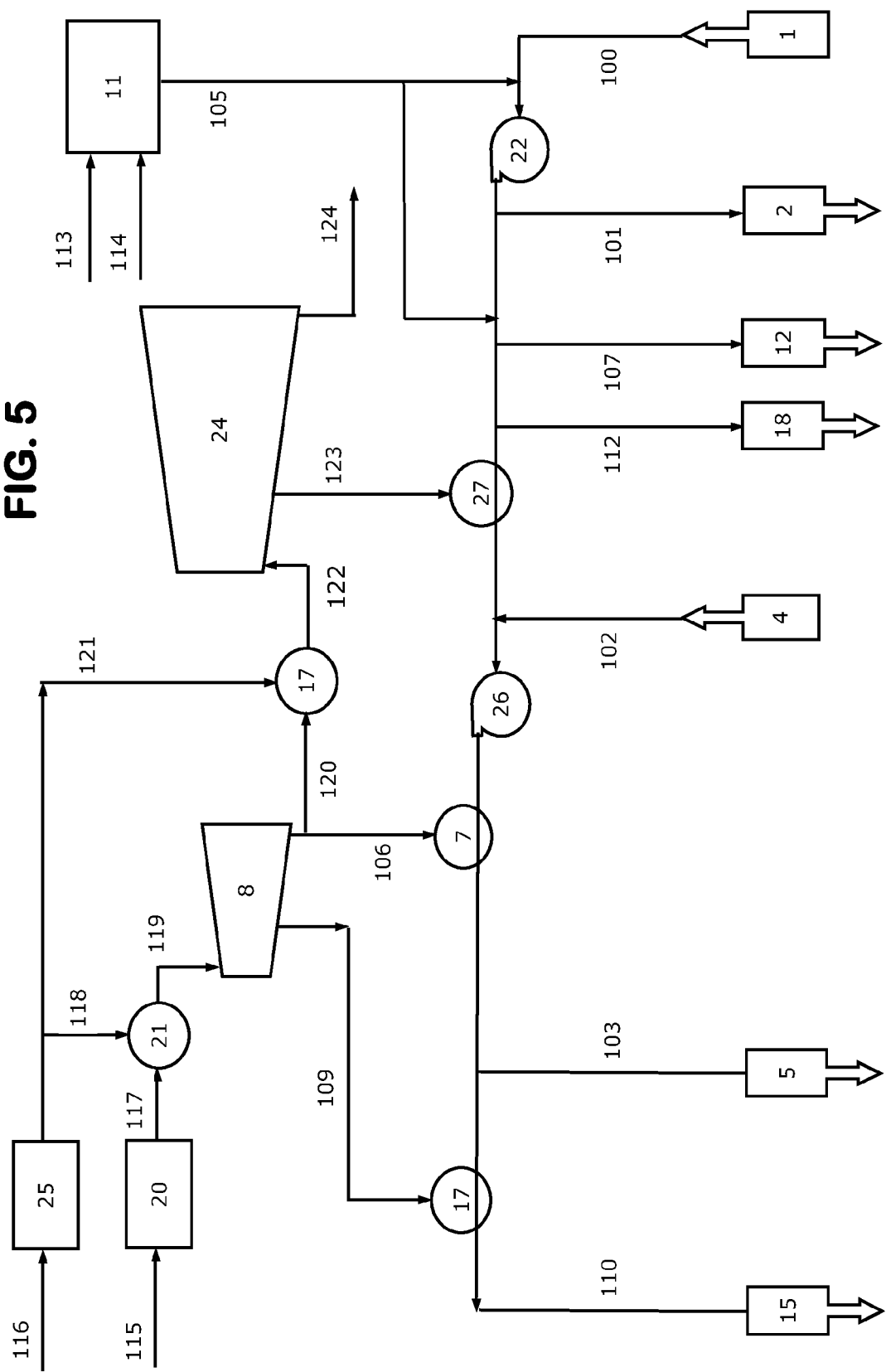
FIG. 5 is a block flow schematic diagram illustrating an exemplary embodiment wherein thermal energy removed from a two stage thermal power plant is used to heat injection fluids to various temperatures for injection into the artificial geothermal reservoir.

An exemplary embodiment showing the basic method for removing thermal energy from a two stage thermal power plant (typically a CSP plant) is illustrated in FIG. 5. Hot working fluids 106, 109, and 123 (typically steam bleeds) are extracted from the high pressure turbine 8, the interstage and the low pressure turbine 24 and used to heat injected fluid (typically brine) in the heat exchangers 7, 17, and 27. The low temperature brine heater would located on the low pressure pump 22 discharge, while the higher temperature brine heaters would be located on the discharge of the high pressure pump 26. The various brine injection flows and brine production flows are shown in FIG. 5 that match up with the wells shown in FIG. 1, FIG. 2, FIG. 3, and FIG. 4.

In some cases, the hot injection wells can be reversed to produce hot fluids to feed the geothermal power plant. In this case, the temperature of fluids from the central hot zone could be high enough in temperature to constitute a separate higher temperature feed stream to the geothermal power plant. FIG. 3 shows the central hot zone wells segregated from other hot zone wells and fed separately to the geothermal power plant. Segregating the hotter production wells in the artificial geothermal reservoir and feeding the hotter fluids separately, increases the thermal efficiency of the power plant.

In the embodiment where a brine reservoir is developed into the artificial geothermal reservoir, and the depth of the reservoir is less than about 2000 feet (610 m), then injecting high pressure steam into the central hot zone is a possible option. Injecting steam will deliver a large amount of thermal energy into the reservoir. The steam injection wells can be reversed, and used to produce the steam and hot brine heated by the steam. Oilfield steamflood experience tends to indicate that the steam chest in the reservoir can last over about 30 days, so recovering a significant quantity of the injected steam is likely.

The spent fluids from the geothermal power plant can be used in the EGS project and injected into the HDR zones, using the injection wells 2 as shown in FIG. 1. Alternatively, the spent fluids can be injected into the artificial geothermal reservoir flanks using the spent brine injection wells 18 shown in FIG. 3.

EGS methods currently being developed in the geothermal industry typically recover thermal energy from a single fractured HDR zone in a rock formation where the temperatures exceed about 200 deg C. In some embodiments, the EGS process in the current methods would use multiple HDR heat recovery zones. Thermal energy recovered from moderate temperature and lower temperatures zones can be used for first stage preheat of the artificial geothermal reservoir, with thermal energy from higher temperature zones used for raising the temperature of the central hot zone or providing feed to the geothermal power plant. FIG. 4 shows multiple HDR zones incorporated into a HDR geosolar project. Heated fluids for pre-heat are recovered from the shallow HDR zone 3, and heated fluids for utilization in the geothermal power plant are recovered from the deeper HDR zone 13.

The injected fluids comprise either of fluids from one of the sources mentioned above, or spent brine from the geothermal power plant. The injection wells 2 inject these fluids 101 into the upper HDR zone 3 and the fluids circulate through open fractures in the zone to a separate upper HDR zone production well 4. The rock formation temperature in the upper HDR zone could be as low as about 150 deg C. (302 deg F.), instead of the 200+ deg C. temperature normally sought for a HDR project. Injection wells 12 inject fluids 107 into the deeper HDR zone 13 and recover the heated fluids 108 in the production wells 14 at temperatures high enough for utilization in the geothermal power plant 11.

In one embodiment previously discussed, the artificial geothermal reservoir is a brine reservoir, and the upper HDR zone recovered fluids 102 are further heated by using thermal energy extracted from a thermal solar power plant (see FIG. 4, heat exchanger 7), with the heated fluids 103 injected to form a hot zone in the artificial geothermal reservoir. The temperature desired in the hot zone will typically be higher by about 30 to 100 deg C. than upper HDR zone recovered fluids. For example, the temperature of the HDR recovered fluids may be only about 150 deg C. (302 deg F.), and this recovered fluid should be further heated to about 230 deg C. (446 deg F.) before injection into the hot zone; in this typical example about 80 deg C. of additional heating is desired.

The current methods have the ability to utilize heat from lower temperature HDR formations than currently thought necessary. These methods add thermal energy to the recovered thermal energy from EGS process, and store the energy in the artificial geothermal reservoir for use when needed. Typical EGS projects entail drilling wells to a depth where sufficiently high temperature HDR formations exist. Utilizing lower temperature thermal energy generally allows shallower well depths, which reduces drilling costs.

Alternatively, a larger cross section of the HDR formations can be tapped. Utilizing thermal energy from the lower temperature HDR formations opens up additional options for drilling, fracturing, and completing the EGS wells. Hydraulically fracturing HDR formations seems to open up previously sealed fractures, generally in the vertical direction. Establishing communication between the injection well and production wells appears to be easier if the well completion intervals intercept these vertical fractures. Additional drilling and completion strategies can recover additional HDR thermal energy from the lower temperature formations and the EGS well development plan can use additional shallow wells to tap these formations. These considerations encourage the use of multiple HDR heat recovery zones in the current methods.

Until commercially proven, EGS has certain risk factors, including HDR formation temperatures less than ideal, high costs associated with drilling into HDR at deep well depths (as compared to geothermal field wells and the large majority of existing oil and gas wells), ability to open and extend rock fractures in HDR formations, the ability to drill and complete the EGS production wells to intercept rock fractures that communicate with the injection wells, and lost injected fluid during the HDR zone circulation. One success factor for EGS projects is the recoverable thermal energy reserves per EGS well.

The methods of the exemplary embodiments described herein are intended to reduce these risks. The methods further heat the HDR heated fluids using thermal energy from an external heat source, so EGS injected fluids recovered at lower temperatures than ideal can be compensated by the additional heating. The recovered fluid will be heated to a temperature where it can be utilized in a geothermal power plant. The lower temperature HDR zones targeted by the EGS process in the current methods are more likely to be at shallower depths where drilling costs and risks are lower. Opening fractures and keeping them open at the lower formation pressures at shallower depths should be easier than in deeper wells targeted in most EGS projects. The required injection pressures are lower for shallow wells, and higher circulation rates may be possible, due to lower pressures and the ability to utilize lower temperature fluids. Fluids can be circulated through the HDR fractures at higher flow rates, with a lower approach temperature to the hot rock temperature to increase the heat recovery rate. It is believed that the higher circulation rate more than compensates for the lower approach temperature.

Another constraint for an effective EGS process is the loss of circulation fluid. Losses of over 10% are common in initial EGS tests. Current assessments indicate that circulation losses should drop off after the EGS project operates over hundreds of circulation cycles. The loss of circulated fluid will likely accumulate to significant volumes of fluid before the losses stabilize. At this time, it is believed that there isn't enough industry experience to indicate that this assumption is valid. Since the current methods can use brine from very large brine reservoirs, the loss of this fluid is not as large a problem. For example, the accumulated fluid losses in the HDR zone could exceed a hundred million barrels, before there is a large impact on a brine reservoir containing several billion barrels.

The artificial geothermal reservoir can be developed with different well development plans, and different operating methods. Injecting higher enthalpy fluids to form a central hot zone that can be separately produced and utilized can enhance the initial hot zone. The embodiment using a brine reservoir could be developed with multiple hot zones in different areas of the original reservoir, where circulating heated brine in each hot zone can be used to gradually raise the temperature. Some hot zones could be used for steam injection. A deeper brine reservoir could be used for hot brine accumulation in a hot zone, while a shallower reservoir could be heated until eventually injected steam forms a steam chest, such that the steam can be produced and used as a separate feed to the geothermal power plant. The methods of the various embodiments described herein enable and include these various alternative hot zone configurations and multiple reservoir options.

Once a significant reserve of thermal energy is accumulated in one of the artificial geothermal reservoir hot zones, the zone could be produced, cooling the hot zone due to an influx of replacement fluids from injection wells or from surrounding fluid saturated reservoir rock formations. Once the zone is cooled significantly, the preheat stage can start again, using heated fluids from the EGS project.

When a CSP project provides an intermittent and variable external heat source to an HDR geosolar project, extending the CSP plant operation and continuously heating EGS production fluids for injection into the artificial geothermal plant, requires TES systems. There are many configurations of solar collection systems integrated with TES systems to supply CSP plants and geothermal power plants. Methods for integrating TES with a CSP plant utilizing solar thermal energy from hybrid solar collections systems and supplying supplemental thermal energy to a geothermal power plant are described in U.S. Provisional Patent Application No. 61/316,240 titled "Systems and Methods for Integrating Concentrated Solar Thermal and Geothermal Power Plants Using Multistage Thermal Energy Storage" and filed on Mar. 22, 2010, the subject matter of which is incorporated by reference herein in its entirety (and referred to herein as the "Basic Geosolar Methods." Basic Geosolar Methods also cover segregated separate thermal feeds, combined cycle plant options, TES integration options, and condensate water recovery.

Methods for using TES to store thermal energy on a daily cycle, and methods using TES and thermal energy removed from a solar thermal power plant to heat injected fluids to form hot zones in geosolar geothermal reservoirs are described in the Geosolar Injection Methods referenced above and described in U.S. patent application Ser. No. 12/562,080 titled "Methods and Systems for Electric Power Generation Using Geothermal Field Enhancements" and filed on Sep. 17, 2009, the subject matter of which is incorporated by reference herein in its entirety. For the HDR Geosolar process, the same methods for utilizing TES in the geosolar injection process can be used. The produced fluids recovered from an EGS process replaces the fresh brine from a naturally occurring geothermal field, but methods for processing the fluids, pumping and heating the produced fluids and injecting the heated fluids to form the hot zone in the geothermal reservoir are substantially identical for the important methods.

In the methods of the exemplary embodiments described herein, the geothermal power plant design and operation could be quite different than most existing geothermal power plants. A combined cycle geothermal plant would probably be used to recover and utilize the thermal energy added to the fluids in the artificial geothermal reservoir hot zone. One possible configuration would use a steam Rankine cycle for the top cycle, with the bottom cycle a binary fluid Rankine cycle in order to extract additional thermal energy from the circulated brine. A Kalina cycle could be an attractive option for most efficiently utilizing the recovered thermal energy.

Combined cycle power plants facilitate the use of segregated heated fluids with different enthalpies or at different temperatures. This is particularly useful for HDR geosolar applications.

One likely embodiment of a combined power cycle using separate thermal feeds, would use higher temperature thermal energy recovered from TES to provide boiler, superheat, or reheat to the top cycle in the geothermal plant. The added higher temperature heat would be converted to electricity at a higher thermal efficiencies if used in to boost power cycle working fluid temperatures, compared to providing a sole source of thermal energy to a power plant.

When the geothermal power plant uses a combined cycle with the top Rankine cycle steam working fluid condensed using working fluid from the bottom binary fluid Rankine cycle or a Kalina cycle, then the condensed steam can recovered and utilized. This condensate water could be used for wet cooling for the solar thermal power plant.

The methods discussed in Basic Geosolar Methods referenced above that are described in U.S. Provisional Patent Application No. 61/316,240 titled "Systems and Methods for Integrating Concentrated Solar Thermal and Geothermal Power Plants Using Multistage Thermal Energy Storage" and filed on Mar. 22, 2010, the subject matter of which is incorporated by reference herein in its entirety, are intended to cover these various geothermal power plant options, designs, configurations, and operations that would be applicable to the current methods.

In an HDR geosolar process, the solar fields will provide solar thermal energy intermittently and with significant variability. TES can keep the solar thermal power plant operating during supply interruptions of ranging from less than one hour to longer time periods of 16 hours, depending on the TES capacity. TES can also provide thermal energy for the brine heaters during short low solar energy periods during the day. And TES can provide thermal energy for utilization in the geothermal power plant as discussed above. Although integrating TES into a HDR geosolar process will increase the ability to operate some of the systems continuously, there may still by cycle variations.

During the preheat stage, the heated fluids recovered from the EGS project can be continuously injected into the artificial geothermal reservoir. When the EGS heated fluids are recovered and further heated for injection into the hot zone using intermittent and variable thermal energy source, such as thermal energy extracted from a CSP plant, then there is a higher demand for EGS heated fluids during the daytime high insolation periods. One solution to address this variable demand and keep the EGS production at a steady rate, is to shift injection between the preheat zone and the hot zone.

Another solution would be to reduce EGS heated fluid production rates during the night, while maintaining EGS injection rates, and then later during daytime periods, increasing the EGS production to a higher rate than the injection rate to draw down accumulated fluids from the fractured HDR formation. HDR formations typically exhibit enough elasticity to facilitate this cycling. The fresh brine production rate from the artificial geothermal brine reservoir can be maintained at a steady rate to keep EGS injection steady, while brine injection into the artificial geothermal reservoir is increased during the daytime, and shifted between preheat zone injection and hot zone injection as the brine heater heat supply varies. This results in a daily cycle in EGS production coupled with higher daytime hot zone injection rates. Although these rates can be varied extensively, well and brine heater operation improves if a continuous EGS production/ and heated brine injection is maintained without a complete stoppage or shutdown. The use of TES to supply around the clock thermal energy to maintain minimum heated brine injection flows is preferred.

A HDR geosolar project may experience a seasonal cycle. The artificial geothermal reservoir hot zone will likely vary seasonally. During the Northern Hemisphere location spring months of March, April, and May, a large pool of heated brine will typically be accumulated as insolation increases while demand and pricing for electric power lags. In the summer months of June and July, peak demands for electricity will use the high insolation available, with only limited drawdown of stored energy in the artificial geothermal reservoir. During the late summer months of August through September should see a drawdown of hot fluids from the artificial geothermal reservoir, with the drawdown continuing through the fall and winter. This annual seasonal cycle to respond to variations in solar energy supply and electricity demands is a key advantage of the HDR geosolar process.

When the artificial geothermal reservoir hot zone has been repeatedly cycled, the rock formation in the central zone will have heated up significantly. The reservoir rock formation temperature will rise until it approaches an average temperature between the preheat temperature and the highest hot zone temperature reached. It is believed that this will take more than five years or longer, depending on the uniformity of the fluid flood during heated fluid injection, which in turn depends on the formation permeability, natural and artificial fracturing, and heated fluid residence time in the hot zone. If the high temperature heated fluid occupies the hot zone for an average time of six months prior to recovery each year, this will heat the hot zone more quickly than a residence time of only three months. If some stored thermal energy is stored year over year, the hot zone should heat up even more quickly.

The naturally occurring brine in the targeted artificial geothermal reservoir is the most likely fluid circulated, both through the EGS process and through the artificial geothermal reservoir. However, other fluids could be suitable for either process.

EGS processes under development are considering a number of different fluids from different sources. The current methods increase the possibility of using alternatives for the injected EGS fluids. There are likely some incentives to control the salinity and mineral content of the EGS injected fluids. If a combined cycle geothermal power plant is used as discussed in some of the current methods, the low salinity low mineral content condensate water from the steam cycle can be removed from the power plant and used to dilute the EGS injected brine. Lower salinity brines can be recovered from other naturally occurring brine reservoirs and used as all or part of the EGS injected brine. If available, fresh water or wastewater sources may be used for makeup water. Some prior methods contemplate using a non-aqueous fluid for EGS injected fluid, such as supercritical carbon dioxide or an organic hydrocarbon fluid. These fluids could be used to recover thermal energy from the HDR zones in an EGS process, followed by using heat exchangers to heat the fluids circulated through the artificial geothermal reservoir in the current methods.

There are also likely incentives to control the salinity and mineral content of brine injected into the hot zone of the artificial geothermal reservoir. The low salinity low mineral content condensate water from a combined cycle geothermal power plant steam cycle can be removed from the power plant and used to dilute the EGS injected brine. Alternatively, the condensate can be heated and injected directly into some of the hot zone, or the condensate, or some other source of water, can be used in a steam generator to generate high pressure steam for injection into the hot zone. Steam injection could be used to develop a steam cap in the reservoir.

Figure 8:
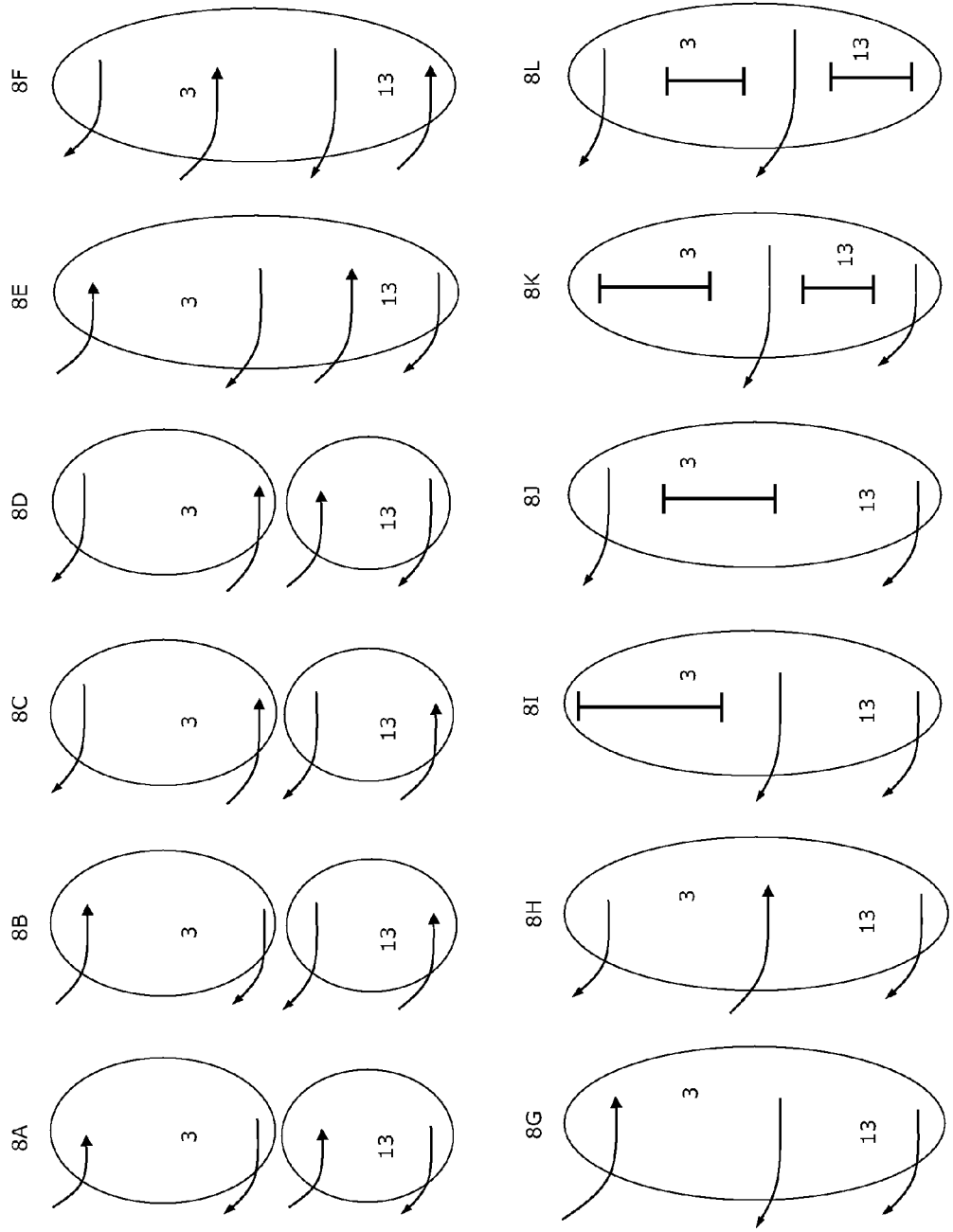
FIG. 8 is a schematic drawing illustrating various alternative embodiments wherein different injection and production intervals are used to inject and produce fluids from hot dry rock zones.

Establishing communication between the EGS injection wells and production wells appears to be easier if the well completion intervals intercept open vertical fractures. FIG. 8 shows some relatively simple configurations for vertical circulation in HDR zones involving multiple injection and production wells. One configuration (8D zone 3) involves drilling to the depth where the HDR formation is at a temperature high enough to recover thermal energy suitable for geothermal power plant operation directly. The well is fractured extensively, opening up sealed fractures in the formation. Another well is drilled to a shallower depth, and also fractured such that the opened vertical fractures of the first well are intercepted. There are several options to complete the EGS production well pairing. The shallow well would become the HDR heated brine producer, and the deeper well the brine injector as shown in 8D zone 3. In this configuration the heated brine produced would be suitable for preheating the artificial geothermal reservoir, but probably won't produce brine hot enough for directly feeding the geothermal plant. Drilling another production well into the HDR zone beneath the injection zone, and fracturing this well to intercept the injection well fractures could further develop this configuration (8H). The injected fluids would flood both the upper HDR zone 3 to produce preheat fluids, and the deeper HDR zone 13 to provide higher temperature fluids for either utilization in the geothermal power, or injection into the central hot zone of the artificial geothermal reservoir.

Another configuration (8I) would inject fluid into the shallow well, and recover heated fluids from the deeper zones. If the temperature gradient of the fractured HDR zone is significant, then this configuration could be attractive. In order to use multiple well configurations as shown in FIG. 8 it is believed that a significant section of fractured HDR formation would be required.

Figure 6:
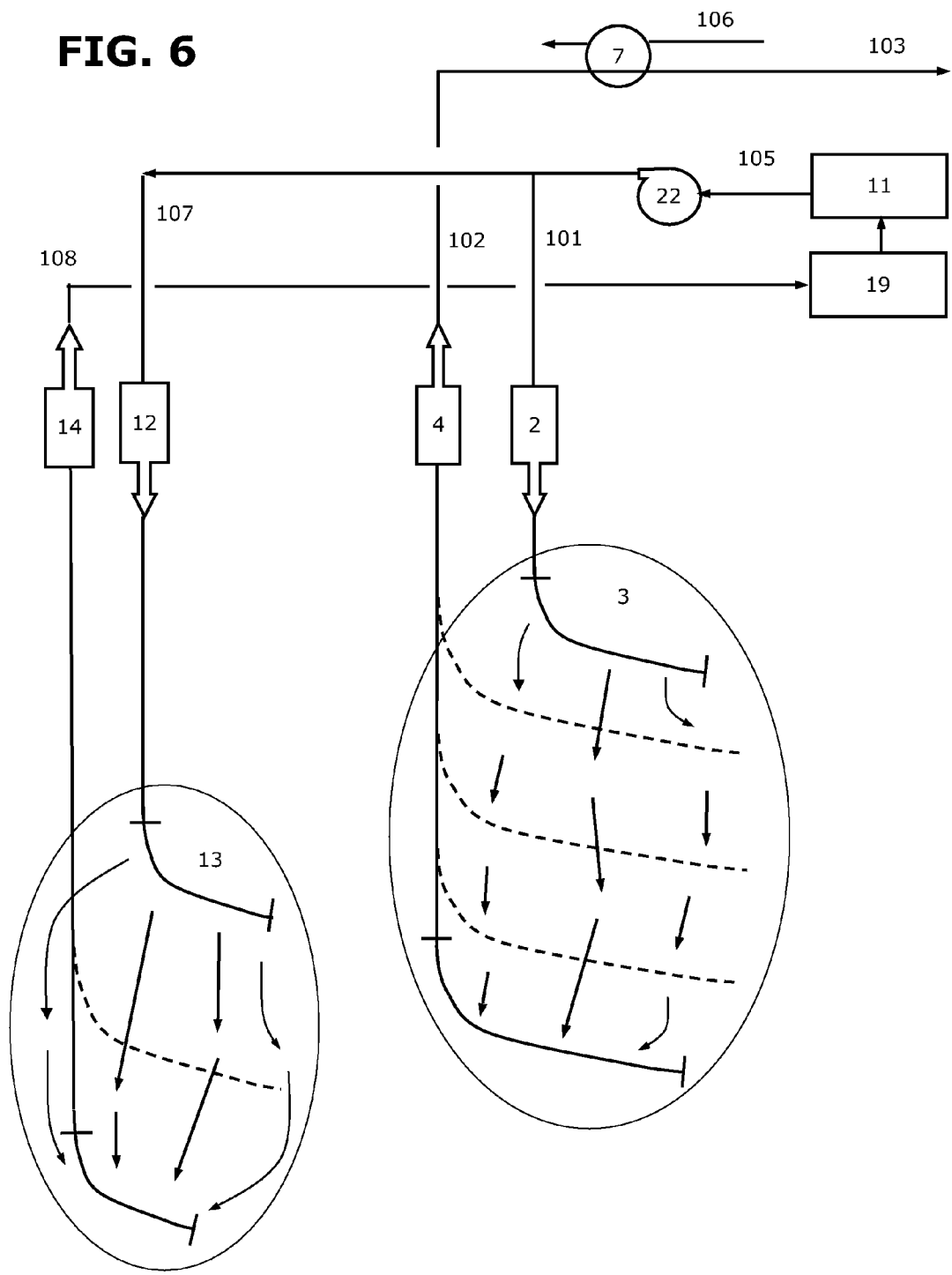
FIG. 6 is a block flow schematic diagram combined with a schematic drawing illustrating an exemplary embodiment wherein fluids are circulated through two fractured hot dry rock zones, wherein each zone was repetitively re-drilled and hydraulically fractured to form extended fractured sections.
Figure 7:
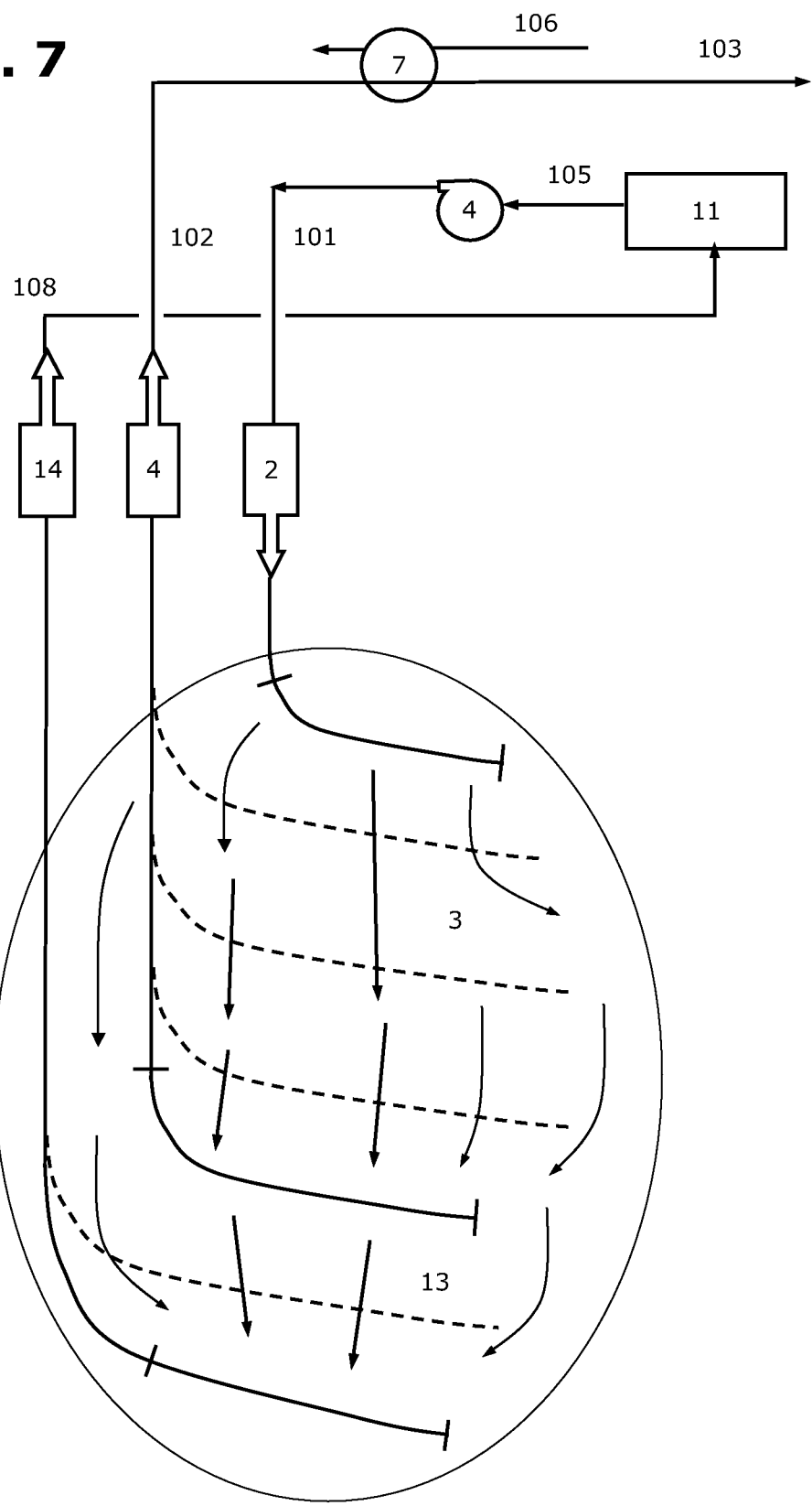
FIG. 7 is a block flow schematic diagram combined with a schematic drawing illustrating an exemplary embodiment wherein injection fluids are injected in the shallow portion of an extended fractured section, with production well completion intervals located in the fractured section to collect fluids to pre-heat an artificial geothermal reservoir and collect heated fluids for utilization in a geothermal power plant.

Because of the ability to use lower temperature recovered thermal energy and reduced concerns about fluid losses, more extensive HDR fracturing methods appear feasible. One method according to an exemplary embodiment (illustrated in FIG. 6 and FIG. 7) would greatly increase the section of fractured rock volume per EGS production well. This method starts with drilling a conventional injection wellbore to the top of the HDR zone. Then the well is deviated and slant drilled into the top of the HDR zone using a smaller diameter drill bit, resulting in a borehole often called a "slimhole" in the drilling industry. The slimhole portion of the borehole is not completed, but simply fractured using high pressure water pumps to open fractures in the top of the HDR zone. The purpose of the slimhole portion is to deliver the high pressure fracturing fluids into the rock formation. After opening these fractures, the well is sidetracked and drilled to a slightly deeper depth, with the first slimhole section abandoned. Then a new slimhole is drilled to a deeper depth into the HDR zone, The second slimhole portion is fractured such that these fractures intercept the first slimhole fractures. This process can be repeated several times until a large vertical section of the HDR zone has been penetrated by fractures (see FIG. 7). The fractured rock column could extend in a vertical cross-section of HDR zone of approximately 1500 to 3000 m (approximately 5000 to 10000 feet). Then the well is finally drilled to the total completion depth, and completed as the fluid injection well. A second well is drilled to penetrate the top portion of the fractured rock column, and fractured and completed as the production well. This method opens a large volume of hot rock exposed to the injected fluid for heat recovery. The estimated thermal energy reserves per EGS well should be higher since a larger volume of hot rock is accessible using the method.

In EGS processes, generally conductive heat transfer through the HDR rock matrix limits the thermal energy recovery rate over the lifetime of the EGS project. Increasing the number of fractures, the fracture lengths and the volume of rock adjacent to the fracture network, increases the long term recovery rate of thermal energy from HDR resources.

There are other configurations for drilling and fracturing HDR formations made possible by the ability to inject large amounts of fluid and the ability to utilize lower temperature thermal energy. FIG. 8 illustrates some simple configurations. More complex configurations of sections of fractured HDR zones could be constructed, using various vertical, horizontal, and slant drilled and fractured sections.

One potential use of the current methods, involves integrating an HDR geosolar project with a geosolar project using a naturally occurring geothermal reservoir as the targeted reservoir for heated fluid injection. Methods for enhancing an existing geothermal reservoir are described in U.S. patent application Ser. No. 12/562,080 titled "Methods and Systems for Electric Power Generation Using Geothermal Field Enhancements" and filed on Sep. 17, 2009, the subject matter of which is incorporated by reference herein in its entirety. The geosolar process using a geothermal reservoir can be incorporated into an HDR geosolar process. The fluids recovered from the natural geothermal reservoir don't require preheating and carry recovered geothermal energy and are further heated for injection into the reservoir hot zone. Additionally, geothermal heat recovered in the EGS project is used to heat fluids from lower temperature sources prior to further heating and injection into the geothermal reservoir hot zone.

The source of fluids injected in the HDR zones in the EGS process can be sourced from lower temperature brine production wells in a geothermal field. Alternatively, the spent brine or steam condensate recovered from an existing geothermal plant can be used as the injection fluid in the EGS process portion of an HDR geosolar process. After injecting the spent brine from the geothermal plant, the heated brine can be recovered, heated further in the brine heaters, and injected into the hot zone of the geothermal reservoir. In this method, thermal energy is recovered from the HDR resource and added to the geothermal hydrothermal resource, while at the same time boosting the enthalpy of the hot zone fluids using thermal energy from an external source, such as thermal energy converted and derived from a solar energy source.

The deeper rock formations below a naturally occurring geothermal reservoir are believed to be a likely source of recoverable geothermal energy.

In one variation of the methods of the exemplary embodiments described herein, the rock formations near the deepest hydrothermal zones could be drilled and fractured to open fractures that penetrate up into the hydrothermal zone. The well would be completed deep in the fractured zone and used to inject fluids that recover thermal energy from the HDR zone before the fluids migrate up into the hydrothermal zone. This method would result in a faster circulation of spent brine from a geothermal plant when the spent brine is the injected into the HDR zone. The faster circulation of the spent brine should increase the total geothermal field production rate. This method increases the geothermal energy extraction rate since the thermal energy recovered from the HDR zone is additive to thermal energy recovered from the hydrothermal zone.

If the HDR zone is repeatedly fractured using re-drilled boreholes as discussed above, then it is possible that a fairly large column of rock containing open fractures would exist. The top of this fractured zone could extend into the hydrothermal zone. In this case the fluid injection well would be completed near the bottom of the fractured zone, and the fluid injected would migrate upward. A production well could be completed in the top part of the fractured zone, or in close proximity in the hydrothermal zone to draw not only the injected fluid, but fluid from the hydrothermal zone as well. As appreciated by those skilled in the art, there could be different and more complex configurations for arranging several injection wells and production wells to tap the HDR fractured zones and different alternatives in situating the completion intervals in the various wells.

One embodiment of the current methods is particularly applicable. Oil and gas fields located in high solar insolation regions located above HDR geothermal resources can be used to form the artificial geothermal reservoir. Typically oil fields are underlain by brine saturated rock formations. Existing wells could be deepened and completed as injection and production wells used to form hot zones in these formations and create an artificial geothermal reservoir. If the oilfield is nearly depleted, the concerns about interfering with oil production could be mitigated.

The SAGE process discussed in Meksvanh et. al. uses solar thermal energy to directly heat brine to supercritical conditions and inject the supercritical brine into an oil field for enhanced oil recovery. The Meksvanh process would eventually create an artificial geothermal reservoir, but without the use of geothermal energy to heat the targeted injection zones in the oil field. The methods of the embodiments described herein would use geothermal energy to preheat an oil field brine formation, followed by injecting subcritical fluids such as brine, pressurized hot water, or steam to increase the reservoir temperature and forming an artificial geothermal reservoir. The geothermal energy source is an element in heating the artificial geothermal reservoir.

HDR geosolar projects can be implemented in phases. The methods for the first phase are described in the Basic Geosolar Methods of in U.S. Provisional Patent Application No. 61/316,240 titled "Systems and Methods for Integrating Concentrated Solar Thermal and Geothermal Power Plants Using Multistage Thermal Energy Storage" and filed on Mar. 22, 2010, the subject matter of which is incorporated by reference herein in its entirety, with the key difference that in the methods of the embodiments described herein, an EGS project is developed in the first implementation stage.

A suitable demonstration project would develop an EGS project to tap HDR resource near or below an existing geothermal field, and use thermal energy from solar fields (installed to eventually develop into a CSP project) to boost the EGS heated fluids for use in the existing geothermal power plant. The use of TES to extend the availability of the thermal energy to non-insolation time periods, is an integral part of this first project phase. The second phase in the development would be to begin injecting the heat boosted EGS fluids into a suitable hot zone designated in the artificial geothermal reservoir. The brine formation selected for the artificial geothermal reservoir can either be on the periphery of the existing geothermal field, or alternatively, the existing geothermal reservoir could be targeted for the hot zone. The third phase would involve the installation of the CSP plant, coupled with raising the temperature of the heat transfer fluids transferring thermal energy from the solar fields, expanding the TES and increasing the operating temperature of the TES modules to provide extended hours of operation for the CSP plant, and continuing heated fluid injection. In this third phase, the fluid heaters (example: brine heaters) would now be using thermal energy extracted from the CSP plant or moderate temperature TES. The final development phase would involve recovery of heated fluids from the hot zone, and could include adding additional geothermal power plant capacity, particularly a combined cycle geothermal power plant utilizing a steam Rankine cycle with a binary fluid organic Rankine cycle. This plant could then recover some steam condensate that can be used for several purposes, including heating the condensate to provide hot zone injection fluids, or alternatively, or additionally, to provide a source of wet cooling for the CSP plant.

In a similar manner, an HDR geosolar project could involve phased development near an existing coal or natural gas fueled power plant, if a suitable HDR resource exists nearby that can be recovered in an EGS project. In this embodiment, the recovered EGS thermal energy could be used for preheat of the existing power plant working fluids, and the solar fields could provide higher temperature preheat. The first development phase would include the same activities as discussed above, with the addition of starting the injection of heated fluids to begin preheating the artificial geothermal reservoir. The second development phase would include heating the EGS heated fluids further using thermal energy either from solar fields or extracted from the existing power plant. The third development phase would include the startup of the CSP power plant as discussed above and in this embodiment it is likely some design modified geothermal power plant would also be installed and started. The CSP and geothermal power plants could share a common bottom power cycle.

At a greenfield site, an HDR geosolar project would likely begin with an EGS project and installation and startup of an accompanying geothermal power plant. The sequence adding the other processes would follow a similar development pathway as described in the phased demonstration project development described above.

It is also important to note that the construction and arrangement of the elements of the geothermal production system and methods as shown schematically in the embodiments is illustrative only. Although only a few embodiments have been described in detail in this disclosure, those skilled in the art who review this disclosure will readily appreciate that many modifications are possible without materially departing from the novel teachings and advantages of the subject matter recited.

Accordingly, all such modifications are intended to be included within the scope of the present invention. Other substitutions, modifications, changes and omissions may be made in the design, operating conditions and arrangement of the preferred and other exemplary embodiments without departing from the spirit of the present invention.

Unless otherwise indicated, all numbers used in the specification and claims are to be understood as being modified in all instances by the term "about." Accordingly, unless indicated to the contrary, the numerical parameters set forth in the following specification and attached claims are approximations that may vary depending at least upon the specific analytical technique, the applicable embodiment, or other variation according to the particular details of an application.

The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating configuration and arrangement of the preferred and other exemplary embodiments without departing from the spirit of the present invention as expressed in the appended claims.

What is claimed is:

1. A method of storing thermal energy comprising:
    pre-heating pressurized sub-critical fluids using geothermal heat sources; and
    injecting the pre-heated pressurized sub-critical fluids into a rock formation to create a pre-heated artificial geothermal reservoir containing the pre-heated fluids in a temperature range of 100 to 200 degrees C.;
    wherein the rock formation either is permeable, or is relatively impermeable but either has natural fractures or is artificially fractured to allow the pre-heated fluids to flow through the rock formation to displace fluids in the fractures, resulting in an accumulation of the pre-heated injected fluids; and
    wherein the pre-heated fluids are heated by geothermal heat sources comprising geothermal energy recovered from geothermal hot dry rock formations, or a geothermal brine removed from a geothermal power plant.

2. The method of claim 1, wherein the pre-heated fluids are supplied from at least one of a surface source of water or brine selected from the group consisting of: naturally occurring bodies of water including seawater; processed water including partially desalinated seawater; wastewater from industrial, mining, or oil and gas production facilities; and wastewater from sewage treatment facilities.

3. The method of claim 1, wherein the rock formation is in a naturally occurring aquifer or brine reservoir, and has formation fluids present and contains aqueous fluids such as water or brine, the method further comprising:
    producing the formation fluids from one or more production wells,
    heating the formation fluids,
    re-injecting the heated formation fluids into the reservoir using injection wells, and
    circulating the heated formation fluids to accumulate thermal energy in the reservoir.

4. The method of claim 1, further comprising:
    producing fluids from a subsurface source of water or brine in a separate rock formation, including naturally occurring aquifers and brine reservoirs, and
    heating the fluids for injection into the artificial geothermal reservoir rock formation.

5. The method of claim 1, wherein the pre-heated fluids are heated fluids recovered from a power plant operation in the form of at least one of pressurized hot water, pressurized brine, and steam, such that the injected pre-heated fluids have a pressure sufficient to inject and penetrate into the rock formation to create the pre-heated artificial geothermal reservoir.

6. The method of claim 5, wherein the pre-heated fluids are heated by pressurized brine from a geothermal power plant pumped to a pressure sufficient for injection, the method further comprising:

using the pressurized brine to preheat the artificial geothermal reservoir rock formation, prior to injecting a higher-temperature heated fluid.

7. The method of claim 1, wherein the pre-heated fluids are heated by a process for recovering thermal energy from hot dry rock formations comprising:
injecting fluids into a hot dry rock formation that has been hydraulically fractured to open sealed fractures or create new fractures in the hot dry rock formation;
circulating the fluids through the fractures and recovering the heated fluids in at least one production well; and
injecting at least a portion of the heated fluids into the artificial geothermal reservoir rock formation.

8. The method of claim 7 further comprising:
utilizing at least a portion of the heated fluids from the hot dry rock formation in a geothermal power plant; and
subsequently injecting brine from the power plant into the artificial geothermal reservoir.

9. The method of claim 7 further comprising using two or more hot dry rock zones connected by at least one of wells, fractured well zones, and fractured rock zones permitting fluids flow from one hot dry rock zone to another hot dry rock zone; or
wherein the hot dry rock zones are segregated by temperature, the lower temperature hot dry rock zones are used to heat the fluids injected into the artificial geothermal reservoir; or
wherein some hot dry rock zones have lower fluid circulation rates leading to higher temperatures, and some hot dry rock zones have a higher fluid circulation rates leading to intermediate temperatures, the different temperature produced fluids are segregated, and at least one of the segregated fluids is injected into the artificial geothermal reservoir.

10. The method of claim 7 further comprising:
reversing the fluid flow through at least one of the fractured hot dry rock zones; and
recovering heated fluids from at least one reversed injection well and injecting fluids into at least one reversed production well.

11. The method of claim 5, further comprising:
storing at least a portion of the thermal energy from heat sources by heating thermal energy storage media; and
recovering the stored thermal energy from the thermal energy storage media at a subsequent time and using the recovered thermal energy to heat the pre-heated fluids.

12. A method of storing thermal energy comprising:
injecting pre-heated pressurized sub-critical fluids into a rock formation to create a pre-heated artificial geothermal reservoir containing the pre-heated fluids in a temperature range of 100 to 200 degree C., wherein the rock formation either is permeable or is relatively impermeable, but either has natural fractures or is artificially fractured to allow the pre-heated fluids to flow through the rock formation to displace fluids in the fractures, resulting in an accumulation of the pre-heated fluids; and
heating and storing thermal energy in the pre-heated artificial geothermal reservoir by injecting higher-temperature or higher-enthalpy heated fluids to create a hot zone in the artificial geothermal reservoir and increase the artificial geothermal reservoir hot zone temperatures into the range of 180 to 320 degrees C.

13. The method of claim 12, further comprising storing additional thermal energy in the pre-heated artificial geothermal reservoir by heating the injected fluids using thermal energy from at least one of these heat sources:
thermal energy removed from a thermal power plant by exchanging the injection fluids against hot working fluids extracted from the thermal power plant; or exchanging against heat transfer fluids that were heated using hot working fluids extracted from a thermal power plant;
thermal energy from a concentrated solar thermal collection system by either using the pre-heated fluids as a collection fluid, or by using an intermediate heat transfer fluid as the collection fluid wherein the heat transfer fluid exchanges thermal energy with the injection injected fluids;
thermal energy from flue gas or exhaust gas heat recovery units on fired heaters or gas turbines; and
thermal energy recovered from higher-temperature hot dry rock formations followed by injecting and circulating the higher-temperature fluids through the pre-heated artificial geothermal reservoir to sweep the pre-heated fluids from the hot zone of the artificial geothermal reservoir.

14. The method of claim 13, further comprising:
using thermal energy from a thermal energy storage to further heat the injected fluids thereby transferring the stored thermal energy into the pre-heated artificial geothermal reservoir.

15. The method of claim 12, further comprising:
recovering the stored heated fluids from the hot zone of the artificial geothermal reservoir; and
utilizing the heated fluids in at least one geothermal power plant to produce electricity.

16. The method of claim 15, wherein segregated fluid production systems are used to recover heated fluids inside of the hot zone at a higher temperature than fluids recovered outside of the hot zone, and each source of recovered fluids is a separate feed to the geothermal power plant.

17. The method of claim 15, further comprising using a Geosolar Injection Method to store thermal energy, recover thermal energy, and utilize thermal energy from the artificial geothermal reservoir to generate electricity, wherein the Geosolar Injection Method comprises at least one of:
reversing hot zone injection wells to recover the heated fluids prior to reaching thermal equilibrium within the hot zone;
injecting steam into the hot zone to form a steam chest, and reversing the injection wells to produce the steam before reaching thermal equilibrium and collapsing the steam chest;
injecting heated fluids in a central region of the hot zone, and recovering the heated fluids from a peripheral region of the hot zone to circulate heated fluids within the hot zone;
injecting spent brine from the at least one geothermal power plant into flanks of the artificial geothermal reservoir; and injecting pre-heated fluids into pre-heated zones in the artificial geothermal reservoir continuously or periodically to circulate fluids through the pre-heated zones;
alternating an injection of heated brine with an injection of heated pressurized water or steam; and
using multiple hot zones in the artificial geothermal reservoir, staging the hot zones to provide a continuous source of heated fluids production to the at least one geothermal power plant.

18. The method of claim 15, further comprising:
utilizing recovered thermal energy in at least one geothermal power plant to generate electricity; and
using a Basic Geosolar Method to integrate the geothermal power plant into a geosolar project that includes at least one concentrated solar thermal power plant and a thermal energy storage system, wherein the Basic Geosolar Method comprises at least one of:

extracting partially expanded working fluids from the at least one concentrated solar thermal power plant, and using thermal energy contained in the working fluids to charge multiple stages of thermal energy storage modules;

using thermal energy storage modules to store thermal energy in each stage having a specified temperature range associated with that stage;

repositioning the thermal energy storage modules in a cascaded arrangement, wherein the thermal energy storage modules are switched into a higher temperature range stage after charging in a current temperature range stage, or a lower temperature range stage after discharging in the current temperature range stage;

using temperature stages of the thermal energy storage modules to heat the pre-heated fluids or the heated fluids injected to form and replenish the hot zone;

using the higher temperature range stage of the thermal energy storage modules to supply thermal energy to the solar thermal power plant or the geothermal power plant for at least one of purposes of providing supplemental thermal feed, extending power plant operation, increasing thermal feed, and increasing electricity generated; and using thermal energy storage modules to temporarily store thermal energy, and continuously heat injected fluids during peak solar seasonal storage.

* * * * *